United States Patent
Kolb et al.

(10) Patent No.: US 10,197,200 B2
(45) Date of Patent: Feb. 5, 2019

(54) ELECTRICALLY ISOLATING, FIRE-SAFE SEALING ELEMENT

(71) Applicant: Lamons Gasket Company, Houston, TX (US)

(72) Inventors: Steven Kristopher Kolb, Humble, TX (US); Jayson David Denham, Houston, TX (US); Willie A. Jenkins, Humble, TX (US); Benjamin D. Kramer, Littleton, CO (US); Edward Varela, Houston, TX (US)

(73) Assignee: LAMONS GASKET COMPANY, Houston, TX (US)

( * ) Notice: Subject to any disclaimer, the term of this patent is extended or adjusted under 35 U.S.C. 154(b) by 212 days.

(21) Appl. No.: 15/384,894

(22) Filed: Dec. 20, 2016

(65) Prior Publication Data
US 2017/0152973 A1    Jun. 1, 2017

Related U.S. Application Data

(63) Continuation of application No. PCT/US2014/045081, filed on Jul. 1, 2014.

(51) Int. Cl.
| | |
|---|---|
| F16L 23/18 | (2006.01) |
| F16J 15/12 | (2006.01) |
| F16L 57/04 | (2006.01) |
| F16L 23/02 | (2006.01) |

(52) U.S. Cl.
CPC ............. *F16L 23/18* (2013.01); *F16J 15/122* (2013.01); *F16L 23/02* (2013.01); *F16L 57/04* (2013.01)

(58) Field of Classification Search
CPC ............. F16L 23/18; F16L 23/22; F16L 57/04
USPC ......................................... 285/363, 917, 368
See application file for complete search history.

(56) References Cited

U.S. PATENT DOCUMENTS

| | | | |
|---|---|---|---|
| 3,561,793 A | | 2/1971 | Rode |
| 4,364,982 A | * | 12/1982 | Gee ........................ F16J 15/125 277/610 |
| 4,406,467 A | | 9/1983 | Burger et al. |
| 4,776,600 A | | 10/1988 | Kohn |
| 5,316,320 A | | 5/1994 | Breaker |
| 5,427,386 A | | 6/1995 | Breaker |

(Continued)

FOREIGN PATENT DOCUMENTS

| | | |
|---|---|---|
| GB | 2010417 | 6/1979 |
| JP | 08-210569 A | 8/1996 |

(Continued)

OTHER PUBLICATIONS

International Application No. PCT/US2016/061028 International Search Report and Written Opinion dated Feb. 10, 2017. 15 pages.

(Continued)

*Primary Examiner* — Aaron M Dunwoody
(74) *Attorney, Agent, or Firm* — McDonald Hopkins LLC

(57) ABSTRACT

An isolation gasket for use between facing flanges of two flow conduit sections for fluid passage therethrough. The isolation gasket includes non-conductive layers and coatings that cover a flat metal core ring to provide electrical isolation, and a fire resistant layer adjacent another non-conductive layer wherein this side by side arrangement uniquely maintains a seal during a fire. In one form, a serrated ring portion of the flat metal core ring has a convex profile.

26 Claims, 8 Drawing Sheets

(56) References Cited

U.S. PATENT DOCUMENTS

| | | | |
|---|---|---|---|
| 5,511,797 A | 4/1996 | Nikirk et al. | |
| 5,551,703 A | 9/1996 | Morvant | |
| 5,564,715 A | 10/1996 | Wallace | |
| 5,758,882 A | 6/1998 | Torzewski | |
| 5,785,322 A * | 7/1998 | Suggs | F16L 23/18 277/591 |
| 5,984,316 A | 11/1999 | Balsells | |
| 6,091,175 A | 7/2000 | Kinsinger | |
| 6,092,811 A * | 7/2000 | Bojarczuk | F16J 15/122 277/627 |
| 6,322,087 B1 | 11/2001 | Swensen et al. | |
| 6,367,803 B1 * | 4/2002 | Loth | F16L 23/18 277/321 |
| 6,402,159 B1 | 6/2002 | Kohn | |
| 6,419,237 B1 | 7/2002 | More | |
| 6,695,357 B2 | 2/2004 | Schenk et al. | |
| 6,814,358 B2 | 11/2004 | Keck | |
| 7,976,074 B2 | 7/2011 | Anderson et al. | |
| 2003/0080518 A1 | 5/2003 | Burton et al. | |
| 2004/0118510 A1* | 6/2004 | Pollock | F16J 15/122 156/256 |
| 2004/0256129 A1 | 12/2004 | Matsumoto et al. | |
| 2005/0116427 A1 | 6/2005 | Seidel et al. | |
| 2005/0121859 A1 | 6/2005 | Seidel et al. | |
| 2005/0194750 A1 | 9/2005 | Wallace | |
| 2006/0220324 A1 | 10/2006 | Anderson et al. | |
| 2007/0216111 A1 | 9/2007 | Matsui | |
| 2009/0243290 A1 | 10/2009 | Anderson | |
| 2011/0115170 A1* | 5/2011 | Krejci | F16J 15/122 277/647 |
| 2011/0140371 A1* | 6/2011 | Strydom | F16J 15/127 277/609 |
| 2011/0266755 A1 | 11/2011 | Anderson et al. | |
| 2012/0235365 A1* | 9/2012 | Stubblefield | F16J 15/122 277/644 |
| 2013/0328270 A1* | 12/2013 | Stubblefield | F16J 15/122 277/314 |
| 2015/0060352 A1* | 3/2015 | Yoder | B01D 35/28 210/456 |
| 2015/0330509 A1* | 11/2015 | Malus | F16J 15/0887 277/608 |
| 2016/0348817 A1* | 12/2016 | Veiga | F16J 15/065 |
| 2017/0074437 A1* | 3/2017 | Briggs | F16L 23/003 |
| 2018/0135754 A1* | 5/2018 | Veiga | F16J 15/122 |

FOREIGN PATENT DOCUMENTS

| | | |
|---|---|---|
| KR | 10-2013-0067176 A | 6/2013 |
| WO | WO 2006/107798 A1 | 10/2006 |

OTHER PUBLICATIONS

Intellectual Property Office of Singapore, Written Opinion for SG11201610804X, dated Nov. 9, 2017.

International Search Report and Written Opinion issued in PCT/US2014/045081, dated Mar. 27, 2015, 15 pgs.

* cited by examiner

ELECTRICALLY ISOLATING, FIRE-SAFE SEALING ELEMENT

CROSS-REFERENCE TO RELATED APPLICATION

This application is a continuation of International Application No. PCT/US2014/045081 filed Jul. 1, 2014, which is hereby incorporated by reference.

BACKGROUND

Gasket devices positioned between joined pieces or pipes are used to create a seal between the joined pieces and to prevent leakage of material from the joined pieces at the joint. Moreover, in addition to providing a seal for the joint, in some situations it is also desirable to electrically isolate the joint pieces. One example of corrosion resistance for pipelines is cathodic protection. This type of corrosion protection typically requires sealing joints by providing electrical isolation. Another example is when two sides of the joint are made of different metals in which the electrical potential difference between the two metals can create a galvanic corrosion cell if the two sides are not electrically isolated. In other situations it may also be desirable to maintain a seal for the joint during a fire. Fires are dangerous to pipeline workers but the fires can become even more dangerous and deadly if the seal between joints is not capable of containing the material in the pipes during a fire.

Gasket devices have been developed to effectively do one of sealing, electrical isolation, or fire safety. Therefore, multiple gaskets must be used to combat situations where all of these concerns are present which can lead to increased costs as well as compatibility and size issues. Other problems exist when multiple gaskets are used, for example, one gasket device that effectively seals a joint may melt at high temperatures, such as during a fire, so that the seal between flanges is no longer effective and possibly may leak. Leakage of material such as petroleum or gas can be extremely dangerous and can increase the likelihood of fire. As another example, some materials that are resistive to deformation also conduct electricity. Thus there remains a need for improvement in the field of electrically isolated, fire-safe, effective sealing systems.

SUMMARY

The disclosed embodiments of an isolation, fire-safe gasket provide electrical isolation as well as the reliability of defending against a fire while maintaining a competent seal either during a fire or everyday application.

One example of an isolation gasket for use between facing flanges of two flow conduit sections for fluid passage therethrough includes a flat metal core ring having an upper face opposing a lower face and an opening formed therein to allow fluid passage therethrough, wherein the flat metal core ring has a serrated ring positioned between an inner ring and an outer ring. The serrated ring has a plurality of serrations along the upper face and the lower face. The isolation gasket includes a first non-conductive layer on the upper face and the lower face of the inner ring to provide a dieletric barrier for the inner ring, a non-conductive coating on the plurality of serrations along the upper face and the lower face of the serrated ring to provide a dielectric barrier for the serrated ring, and a second non-conductive layer on the upper face and the lower face of the outer ring to provide a dielectric barrier for the outer ring. The isolation gasket also includes a fire resistant layer on the non-conductive coating that is positioned on the serrated ring, wherein the fire resistant layer spans from an outer edge of the serrated ring to a mid-region of the serrated ring and a third non-conductive layer on the non-conductive coating that is positioned on the serrated ring, wherein the third non-conductive layer spans from an inner edge of the serrated ring to the mid-region of the serrated ring, wherein the fire resistant layer abuts against the third non-conductive layer. In one embodiment, the fire resistant layer abuts against the third non-conductive layer at a mid-point between the inner edge and the outer edge of the serrated ring.

Exemplary materials for the isolation gasket include the non-conductive coating being made of polytetrafluoroethylene, the fire resistant layer being made of mica or aluminosilicate, the third non-conductive layer being made of biaxially-oriented filled polytetrafluoroethylene that may be used alone or in combination with one another.

In a first embodiment, the plurality of serrations have a corresponding plurality of alternating peaks and grooves, wherein each of the peaks has a first axial width dimension and each of the grooves has a second axial width dimension, the first axial width dimension being substantially the same for each of the peaks, and the second axial width dimension being substantially the same for each of the grooves. In a second alternative embodiment, the plurality of serrations have a corresponding plurality of alternating peaks and grooves, wherein each of the peaks has a first axial width dimension that is substantially the same for each of the peaks, and wherein the plurality of grooves includes five groups that are orderly arranged across a width of the serrated ring, wherein the outer two groups of the plurality of grooves have a second axial width dimension, the middle two groups of the plurality of grooves have a third axial width dimension, and the center group of the plurality of grooves has a fourth axial dimension, wherein the fourth axial width dimension is larger than the third axial width dimension, and the third axial width dimension is larger than the second axial width dimension. In the second embodiment, the fourth axial width dimension, the third axial width dimension, and the second axial width dimension generally form a convex profile that spans across the width of the serrated ring.

In another example embodiment, a pair of joined flow conduit sections which are constructed and arranged with facing flanges, each flow conduit section having a through bore in combination with an isolation gasket for use between the facing flanges. The isolation gasket includes a flat metal core ring having an upper face opposing a lower face and an opening formed therein to allow fluid passage therethrough, wherein the flat metal core ring has a serrated ring positioned between an inner ring and an outer ring and the serrated ring has a plurality of serrations along the upper face and the lower face. The isolation gasket includes a first non-conductive layer on the upper and the lower faces of the inner ring, a non-conductive coating on the upper and the lower faces of the serrated ring, a second non-conductive layer on the upper and the lower faces of the outer ring, a fire resistant layer on the non-conductive coating that is positioned on the serrated ring, and a third non-conductive layer on the non-conductive coating that is positioned on the serrated ring, wherein the third non-conductive layer is adjacent the fire resistant layer. In one form, the fire resistant layer spans from an outside diameter of the serrated ring to a middle diameter of the serrated ring, and wherein the third non-conductive layer spans from the middle diameter to an inside diameter of the serrated ring.

In one embodiment the combination further includes at least one isolating sleeve positioned in an aligned bore formed in each of the facing flanges, the isolating sleeve having a length that is substantially equal to a distance between an outer face of each of the flanges with the isolation gasket positioned between the facing flanges, at least one elongate metal fastener having opposing ends, the fastener received in the isolating sleeve for connecting the flanges to one another with the isolation gasket interposed therebetween, and an isolating washer positioned on each of the at least one elongate metal fastener abutting the outer face of the flange. In a first embodiment, the isolating washer includes a metal washer having opposing side surfaces with a sheet of dielectric material laminated to one of the opposing side surfaces and wherein the dielectric material abuts at least the outer face of the flange. In another embodiment, the isolating washer includes a metal core coated with a dielectric material. In one form, the isolating sleeve includes a sleeve made of one of glass reinforced polymer material, epoxy material, phenolic material, and meta-aramid material. In another form, the metal fastener includes a metal shaft threaded to receive a nut on at least one of the opposing ends.

In a first embodiment, the plurality of serrations have a corresponding plurality of alternating peaks and grooves, wherein each of the peaks has a first axial width dimension and each of the grooves has a second axial width dimension, the first axial width dimension being substantially the same for each of the peaks, and the second axial width dimension being substantially the same for each of the grooves.

In a second embodiment, the plurality of serrations have a corresponding plurality of alternating peaks and grooves, wherein each of the peaks has a first axial width dimension that is substantially the same for each of the peaks, and wherein the plurality of grooves includes five groups that are orderly arranged across a width of the serrated ring, wherein the outer two groups of the plurality of grooves have a second axial width dimension, the middle two groups of the plurality of grooves have a third axial width dimension, and the center group of the plurality of grooves has a fourth axial dimension, wherein the fourth axial width dimension is larger than the third axial width dimension, and the third axial width dimension is larger than the second axial width dimension. In one form, the fourth axial width dimension, the third axial width dimension, and the second axial width dimension generally form a convex profile that spans across the width of the serrated ring.

In another example embodiment of an isolation gasket for use between facing flanges of two flow conduit sections for fluid passage therethrough, the isolation gasket includes a flat metal core ring having an upper face opposing a lower face and an opening formed therein to allow fluid passage therethrough. The flat metal core ring has a serrated ring positioned between an inner ring and an outer ring wherein the serrated ring having a plurality of serrations along the upper face and the lower face. A first non-conductive layer is positioned on the upper face and the lower face of the inner ring to provide a dieletric barrier for the inner ring, a second non-conductive layer on the upper face and the lower face of the outer ring to provide a dielectric barrier for the outer ring, and a non-conductive coating is applied on the plurality of serrations of the upper face and the lower face of the serrated ring to provide a dielectric barrier for the serrated ring. A fire resistant layer and a third non-conductive layer are arranged in a side by side orientation on the non-conductive coating applied on the plurality of serrations of the serrated ring, wherein each of the fire resistant layer and the third non-conductive layer covers approximately half of the serrated ring. In one embodiment, the fire resistant layer spans from an outer edge of the serrated ring to a mid-region of the serrated ring, and the third non-conductive layer spans from an inner edge of the serrated ring to the mid-region of the serrated ring such that the fire resistant layer and the third non-conductive layer do not overlap.

In a first embodiment of the isolation gasket, the plurality of serrations have a corresponding plurality of alternating peaks and grooves, wherein each of the peaks has a first axial width dimension and each of the grooves has a second axial width dimension, the first axial width dimension being substantially the same for each of the peaks, and the second axial width dimension being substantially the same for each of the grooves. In a second embodiment of the isolation gasket, the plurality of serrations have a corresponding plurality of alternating peaks and grooves, wherein each of the peaks has a first axial width dimension that is substantially the same for each of the peaks, and wherein the plurality of grooves includes five groups that are orderly arranged across a width of the serrated ring, wherein the outer two groups of the plurality of grooves have a second axial width dimension, the middle two groups of the plurality of grooves have a third axial width dimension, and the center group of the plurality of grooves has a fourth axial dimension, wherein the fourth axial width dimension is larger than the third axial width dimension, and the third axial width dimension is larger than the second axial width dimension. In the second embodiment of the isolation gasket, the fourth axial width dimension, the third axial width dimension, and the second axial width dimension generally form a convex profile that spans across the width of the serrated ring.

Further forms, objects, features, aspects, benefits, advantages, and embodiments of the present invention will become apparent from a detailed description and drawings provided herewith.

DETAILED DESCRIPTION

Figure 1:
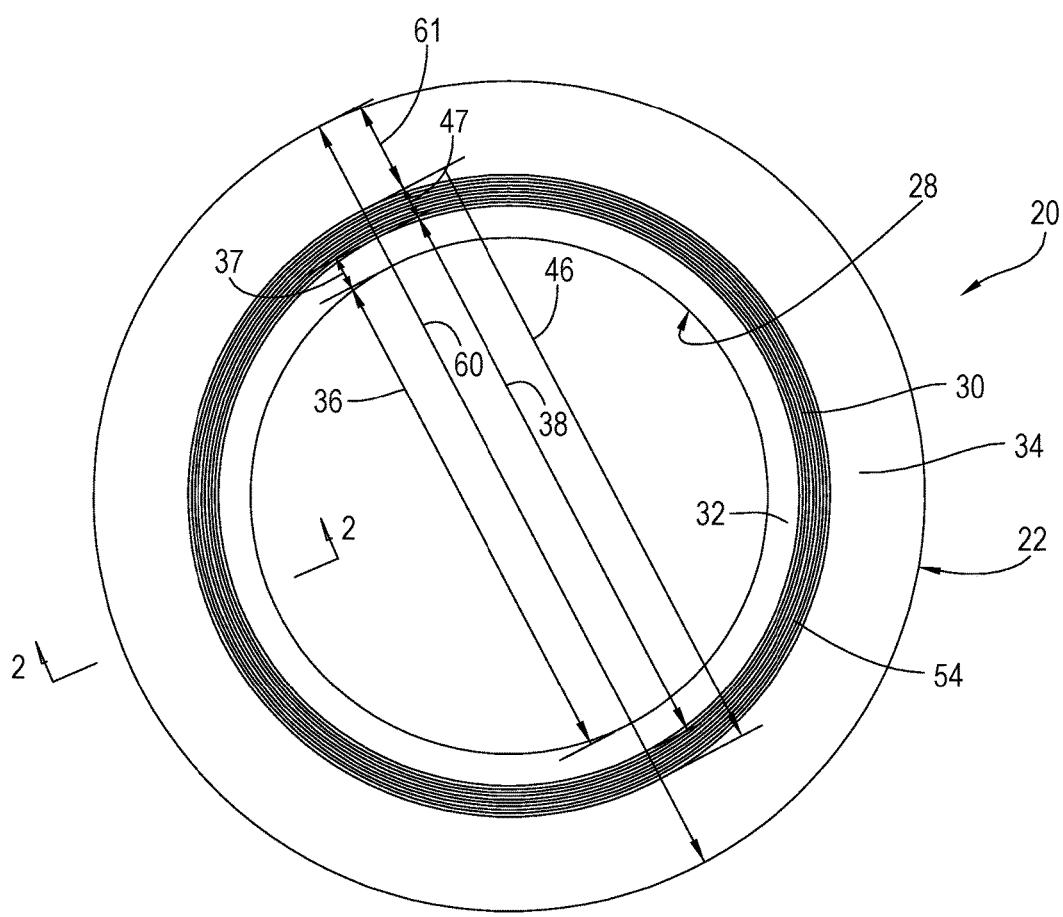
FIG. 1 illustrates a top view of a first embodiment of an isolation gasket.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates. One embodiment of the invention is shown in great detail, although it will be apparent to those skilled in the relevant art that some features not relevant to the present invention may not be shown for the sake of clarity.

In order to help with an understanding of the exemplary embodiment, a representative isolation gasket 20 is disclosed and illustrated in FIGS. 1, 2, 3, and 4. The isolation gasket 20 is configured for use between facing flanges of two flow conduit sections for fluid passage therethrough. Some types of fluid that could pass through flow conduit sections include oil, petroleum, natural gas, other flammable materials, and many other types of fluid. As can be appreciated, fluid leakage of any of these fluids could be extremely dangerous and toxic. The isolation gasket 20 includes a flat metal core ring 22 that has an upper face 24 opposite a lower face 26 and an opening 28 formed therein to allow fluid passage therethrough when the isolation gasket 20 is assembled with the fluid flow conduit sections as described in more detail below. The isolation gasket 20 includes a first non-conductive layer 70, a second non-conductive layer 72, a non-conductive coating 74, a fire resistant layer 76, and a third non-conductive layer 78 that in combination create a fire resistant and electrically isolating seal. Each of these elements of the isolation gasket 20 will be described next.

The flat metal core ring 22 has a serrated ring 30 positioned between an inner ring 32 and an outer ring 34. The inner ring 32 has an inside diameter 36 that corresponds to the diameter of the opening 28. In one embodiment, the inside diameter 36 matches the inner diameter of the flow sections of pipe into which it is placed. In other words, the inner diameter 36 is substantially the same size as the inner diameter of the bore which has been found to reduce potential corrosion. The inner ring 32 has an outside diameter 38 that corresponds to the interface between the inner ring 32 and the serrated ring 30. The inner ring 32 has a width 37 that spans between the inside diameter 36 and the outside diameter 38. The inner ring 32 also has an upper face 40 opposite a lower face 42 with a depth or thickness 44 that spans between the upper and the lower faces 40 and 42, respectively. The depth 44 of the inner ring 32 is greater than a depth 66 of the outer ring 34 which has been found to beneficially reduce potential corrosion. In one embodiment, the upper and the lower faces 40 and 42 have a 0.125 microinches surface finish to improve adhesion of the first non-conductive layer 70.

The serrated ring 30 has an inside diameter that corresponds to the outside diameter 38 of the inner ring 32 to form an interface therebetween. The serrated ring 30 has an outside diameter 46 that corresponds to the interface between the serrated ring 30 and the outer ring 34. The serrated ring 30 has a width 47 that spans between the inside diameter and the outside diameter 46. The serrated ring 30 includes a mid-region or middle diameter that is measured from half-way between the inside diameter and the outside diameter 46 of the serrated ring 30. The serrated ring 30 also has an upper face 48 opposite a lower face 50 with a depth or thickness 52 that spans between the upper and the lower faces 48 and 50. The depth 52 of the serrated ring 30 is greater than either depth 44 of the inner ring 32 or depth 66 of the outer ring 34. The serrated ring 30 has a plurality of serrations 54 that span along the upper face 48 and the lower face 50. The plurality of serrations 54 have a corresponding plurality of alternating peaks 56 and grooves 58, wherein each of the peaks 56 has a first axial width dimension and each of the grooves 58 has a second axial width dimension. The first axial width dimension is substantially the same for each of the peaks 56, and the second axial width dimension is substantially the same for each of the grooves 58. In other words, there is no variance in size between the first axial width dimension of all of the peaks 56 and similarly there is no variance in size between the second axial width dimension of all of the grooves 58.

The outer ring 34 has an inside diameter that corresponds to the outside diameter 46 of the serrated ring 30. The outer ring 34 also has an outside diameter 60 that spans across the width of the flat metal core ring 22. The outer ring 34 has a width 61 that spans between the inside diameter and the outside diameter 60. The outer ring 34 also has an upper face 62 opposite a lower face 64 with a depth or thickness 66 that spans between the upper and the lower faces 62 and 64, respectively. In one embodiment, the upper and the lower faces 62 and 64 have a 0.125 microinches surface finish to improve adhesion of the second non-conductive layer 72. The flat metal core ring 22 is made of metal, including stainless steel, 316 stainless steal, high nickel alloys, or other metal that is appropriate for the flow conduit sections and the material therein. In some embodiments, the metal core ring 22 is made of particular materials such as Inconel® austenitic nickel-chromium-based superalloys, Hastelloy® highly corrosion-resistant metal alloys, and Duplex stainless steel to name a few. Typically the size of inner ring 32, serrated ring 30, and the outer ring 34 correspond to the size of the conduit flow sections into which the rings will be placed when in use. One example includes conduit flow sections sized according to ANSI B16.5 Flange Code and the inner ring 32, serrated ring 30, and the outer ring 34 sized accordingly and as noted above. One benefit for flat metal core ring 22 sized for use with ANSI B16.5 Flange Code enables the outside diameter 60 of the outer ring 34 to self align the isolation gasket 20 with within the bolt circle of the facing flanges. Another benefit for the flat metal core ring 22 sized for use with ANSI B16.5 Flange Code is the inner diameter 36 of inner ring 32 would match the ANSI B16.5 Flange Bore exactly thereby allowing for minimum flange face exposure and allowing for pipe cleaning devices or commonly referred in the industry as "pigs" to pass through the isolation gasket 20 and the flanges when assembled. Yet another benefit is the serrated ring 30 is configured for use with both Ring Type Joints and Raised Face ANSI B16.5 flanges.

Figure 2:
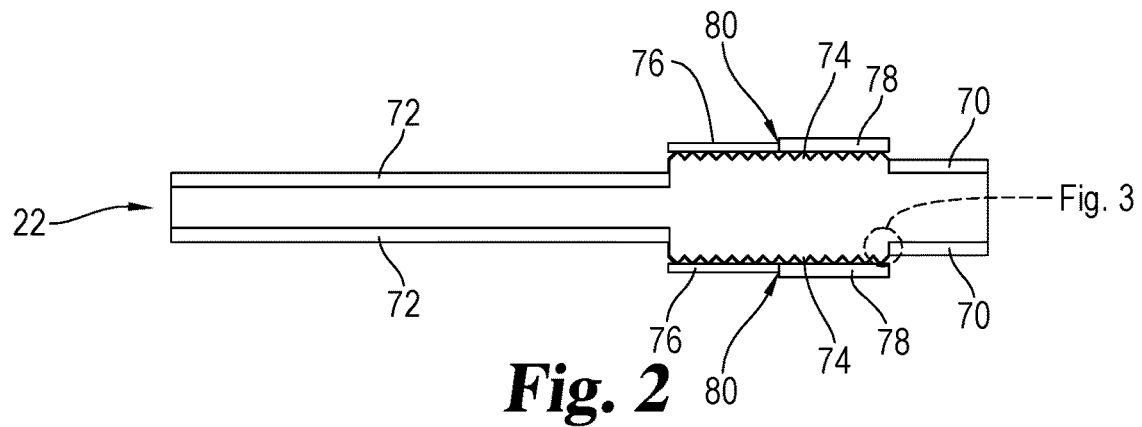
FIG. 2 illustrates a cross sectional view of the isolation gasket in the FIG. 1 embodiment.
Figure 3:
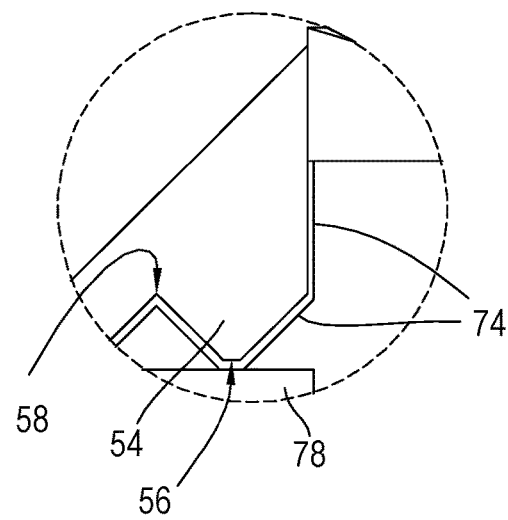
FIG. 3 illustrates a partial, enlarged view of a non-conductive coating on a serrated ring in the FIG. 1 embodiment.
Figure 4:
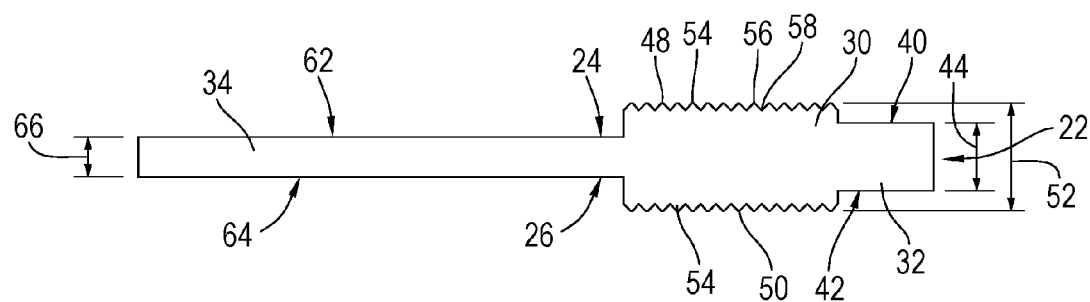
FIG. 4 illustrates a cross sectional view of the flat metal core ring from the isolation gasket in the FIG. 1 embodiment.

The isolation gasket 20 also includes a first non-conductive layer 70 that is placed on the upper face 40 and the lower face 42 of the inner ring 32 to provide a dieletric barrier and electrical isolation for the inner ring 32 as illustrated in FIGS. 1 and 2. The first non-conductive layer 70 spans across the width 37 of the inner ring 32. In one form, the first non-conductive layer 70 also covers the depth 44 of the inside face of the inner ring 32. Suitable materials for the first non-conductive layer 70 include G10 laminated sheet, G11 laminated sheet, electrical glass cloth that is impregnated with epoxy resin under high pressure and high heat, polymer based non-conductive coatings, phenolic resin based material, epoxy based non-conductive coatings, or other suitable dielectric material. There are many techniques to apply the first non-conductive layer 70 to the inner ring 32. One technique is to apply the first non-conductive layer 70 as a coating which is applied via a spray gun to the correct thickness using a thickness gauge. A second technique to apply the first non-conductive layer 70 as a different material is with adhesive or glue. The first non-conductive layer 70 has characteristics of high temperature resistance, high mechanical properties and dielectric properties, and good heat resistance. For example, the material chosen for the first non-conductive layer 70 show allow for a temperature of at least 300 degrees Fahrenheit, at least 25,000 psi compressive strength, and at least 400 V/mill. for dielectric. A typical range of thickness for the first non-conductive layer 70 is between about 0.2 millimeters to about 80 millimeters.

The isolation gasket 20 also includes a second non-conductive layer 72 that is placed on the upper face 62 and the lower face 64 of the outer ring 34 to provide a dielectric barrier and electrical isolation for the outer ring 34 as illustrated in FIGS. 1 and 2. The second non-conductive layer 72 spans across the width 61 of the outer ring 34. In one form, the second non-conductive layer 72 also covers the depth 66 of the outside face of the outer ring 34. Suitable materials for the second non-conductive layer 72 include G10 laminated sheet, G11 laminated sheet, electrical glass cloth that is impregnated with epoxy resin under high pressure and high heat, polymer based non-conductive coatings, phenolic resin based material, epoxy based non-conductive coatings, or other suitable dielectric material. There are many techniques to apply the second non-conductive layer 72 to the outer ring 34. One technique is to apply the second non-conductive layer 72 as a coating which is applied via a spray gun to the correct thickness using a thickness gauge. A second technique to apply the second non-conductive layer 72 as a different material is with adhesive or glue. The second non-conductive layer 72 has characteristics of high temperature resistance, high mechanical properties and dielectric properties, and good heat resistance. For example, the material chosen for the second non-conductive layer 72 allows for a temperature of at least 300 degrees Fahrenheit, at least 25,000 psi compressive strength, and at least 400 V/mill. for dielectric. A typical range of thickness for the first non-conductive layer 70 is between about 0.2 millimeters to about 80 millimeters. The second non-conductive layer 72 can be made of the same material as the first non-conductive layer 70 or a different material depending on the requirements for the isolation gasket 20 in a particular setting. A typical range of thickness for the second non-conductive layer 72 is between about 0.2 millimeters to about 80 millimeters.

The isolation gasket 20 also includes a non-conductive coating 74 that is placed on the serrations 54 including the peaks 56 and the grooves 58 to fully cover the upper face 48 and the lower face 50 of the serrated ring 30 to provide electrical isolation. The non-conductive coating 74 is also placed on an exposed outside face of the serrated ring 30 that spans the depth 52 less either of the depth 44 of the inner ring 32 or the depth 66 of the outer ring 34. Suitable materials for the non-conductive coating 74 include polytetrafluoroethylene (PTFE), any non-conductive polymer, Halar® ECTFE, a copolymer of ethylene and chlorotrifluoroethylene, epoxy based coatings, other variations of PTFE coatings including but not limited to Xylan® 1200 series or Xylan® 1400 series, or other suitable dielectric material. One embodiment of the non-conductive coating 74 includes a PTFE coating about 3 to 5 mils thick that is sprayed on the serrations 54 to cover the peaks 56 and the grooves 58.

The isolation gasket 20 also includes a fire resistant layer 76 placed on the non-conductive coating 74 that is positioned on the upper face 48 and the lower face 50 of the serrated ring 30. The fire resistant layer 76 does not cover all of the non-conductive coating 74 but instead spans from an outer edge of the serrated ring 30 to the mid-region of the serrated ring 30 to thereby cover an outer radial portion of the non-conductive coating 74. Suitable materials for the fire resistant layer 76 include a mica sheet with a silicon binder, mica-based laminate sheets, aluminosilicate, ceramic fiber, and ceramic impregnated materials, to name a few materials. In one embodiment, in the event of a fire, the fire resistant layer 76 made of a mica sheet protects the non-conductive coating 74 and resists melting up to about 1000° C. (1832° F.). In one embodiment, the fire resistant layer 76 is attached to the non-conductive coating 74 on the serrations 54 via adhesive.

The isolation gasket 20 includes a third non-conductive layer 78 placed on the non-conductive coating 74 wherein the third non-conductive layer 78 spans from an inner edge of the serrated ring 30 to the mid-region of the serrated ring 30 to provide electrical isolation and a seal for the isolation gasket 20. The third non-conductive layer 78 does not cover all of the non-conductive coating 74 but instead spans from an inner edge of the serrated ring 30 to the mid-region of the serrated ring 30 to thereby cover an inner radial portion of the non-conductive coating 74. The fire resistant layer 76 and the third non-conductive layer 78 form a boundary 80 therebetween such that the fire resistant layer 76 does not overlap the third non-conductive layer 78. In other words, the fire resistant layer 76 and the third non-conductive layer 78 are arranged in a side by side orientation on the non-conductive coating 74. Some suitable materials for the third non-conductive layer 78 include a chemically inert, biaxially-oriented filled polytetrafluoroethylene (PTFE) or a biaxially-oriented high quality silica-filled PTFE sheet. The biaxial orientation of the PTFE particles creates a unique strength where both the longitudinal and transverse directions of the sheet are equally as strong. This biaxial orientation and addition of fillers such as silica enables the PTFE sheet to resist creep and cold flow when subjected to load. However other embodiments may include different materials that also provide electrical isolation of the serrated ring 30. Other materials for the third non-conductive layer 78 include other PTFE based sheet material, Viton® fluoroelastomer, nitrile, EPDM or ethylene propylene diene monomer (M-class) rubber, and any other compressed sheet non-conducting material.

There are many benefits or advantages to the combination of the fire resistant layer 76, the third non-conductive layer 78, and the non-conductive coating 74. Beneficially the combination of the fire resistant layer 76 and the third non-conductive layer 78 for facings on the non-conductive coating 74 provide the unique benefits of a superior seal, high thermoresistive properties, and electrical isolation. Moreover, the unique placement of the fire resistant layer 76 adjacent the third non-conductive layer 78 enables the fire resistant layer 76 to protect the third non-conductive layer 78 in the event of a fire and thereby maintain the seal. The third non-conductive layer 78 forms a seal when the isolation gasket 20 is assembled between two flow conduit sections. The fire resistant layer 76 is typically not as strong as third non-conductive layer 78 such that the third non-conductive layer 78 is able to withstand higher pressures. Therefore the third non-conductive layer 78 is placed closer to the inner edge of the serrated ring 30 and the fire resistant layer 76 is placed closer to the outer edge of the serrated ring 30 in a side by side orientation. Also beneficially the non-conductive coating 74 on the serrations 54 maintains a dielectric barrier in the possible situation that if the bolts are overstressed such that the loads on the bolts are too high causing the serrations 54 to cut through the fire resistant layer 76 and the third non-conductive layer 78 there is no metal to metal contact resulting in conductivity. Also beneficially the first non-conductive layer 70, second non-conductive layer 72, and non-conductive coating 74 on the gasket 20 provide electrical isolation.

Figure 5:
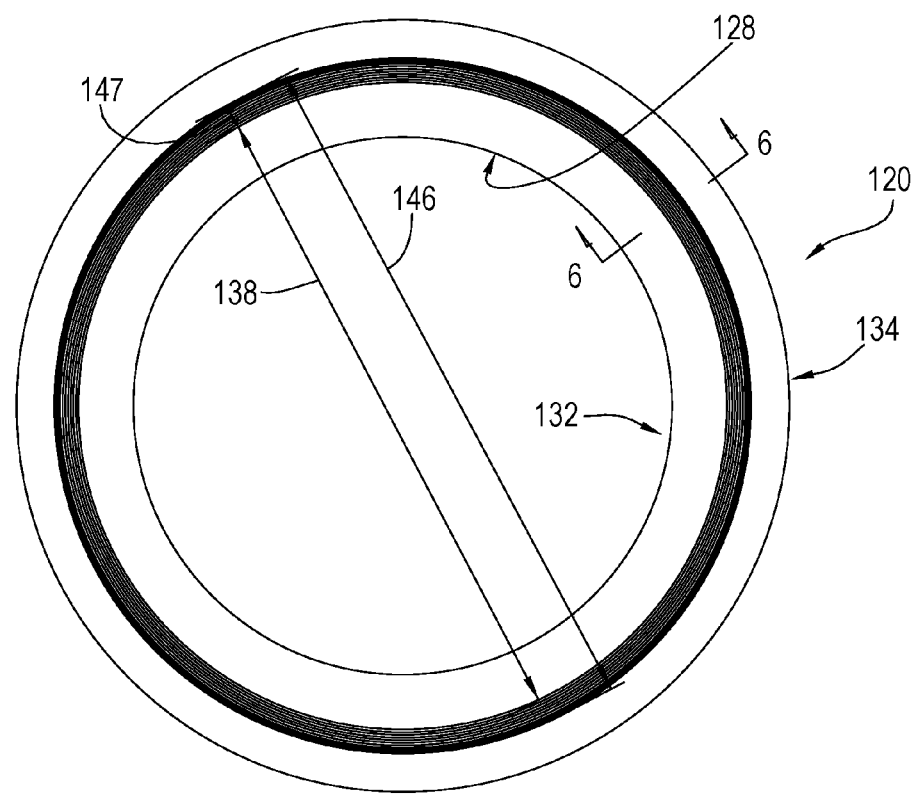
FIG. 5 illustrates a top view of a second embodiment of an isolation gasket.
Figure 6:
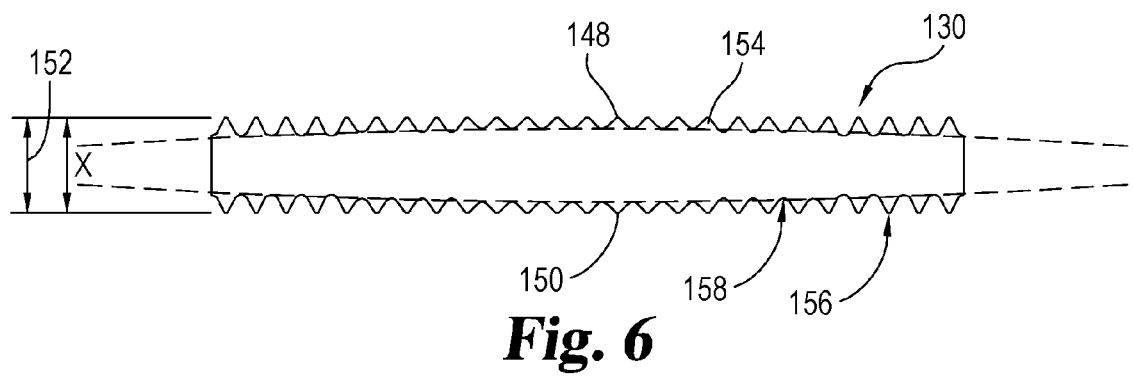
FIG. 6 illustrates a cross sectional view of a serrated ring from the isolation gasket in the FIG. 5 embodiment.
Figure 7:
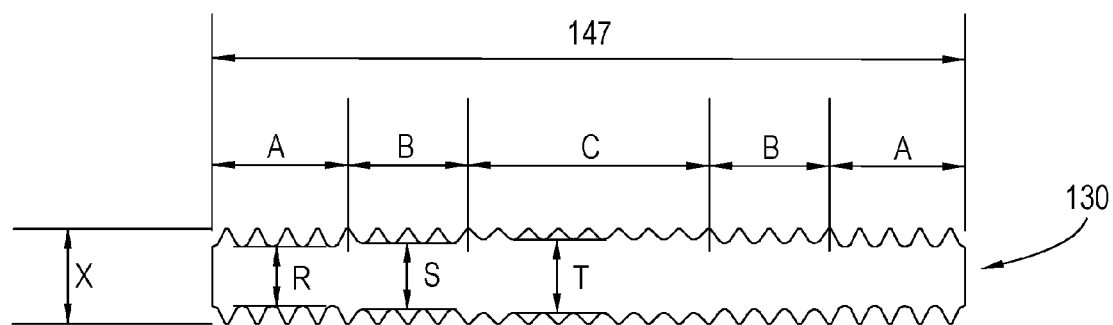
FIG. 7 illustrates the cross sectional view of the serrated ring from the FIG. 6 embodiment.

A second embodiment of an isolation gasket 120 is disclosed and illustrated in FIGS. 5, 6, and 7. The isolation gasket 120 is configured for use between facing flanges of two flow conduit sections for fluid passage therethrough. The isolation gasket 120 is similar in all aspects to the isolation gasket 20, except a serrated ring 130 is configured differently from serrated ring 30. Therefore for the sake of brevity similar features for isolation gasket 120 and isolation gasket 20 will not be described. The isolation gasket 120 includes a flat metal core ring that has an upper face opposite a lower face and an opening 128 formed therein to allow fluid passage therethrough when the isolation gasket 120 is assembled with the fluid flow conduit sections as described in more detail below. The isolation gasket 120 also includes a first non-conductive layer, a second non-conductive layer, a non-conductive coating, a fire resistant layer, and a third non-conductive layer (collectively not illustrated) that in combination create a fire resistant and electrically isolating seal similar in all aspects to isolation gasket 20.

The flat metal core ring of isolation gasket 120 has a serrated ring 130 positioned between an inner ring 132 and an outer ring 134. Similar to serrated ring 30, the serrated ring 130 has an inside diameter that corresponds to an outside diameter 138 of the inner ring 132 to form an interface therebetween. The serrated ring 130 has an outside diameter 146 that corresponds to the interface between the serrated ring 130 and the outer ring 134. The serrated ring 130 has a width 147 that spans between the inside diameter and the outside diameter 146. The serrated ring 130 also has an upper face 148 opposite a lower face 150 with a depth or thickness 152 that spans between the upper and the lower faces 148 and 150, respectively.

The serrated ring 130 has a plurality of serrations 154 that span along the upper face 148 and the lower face 150. The plurality of serrations 154 have a corresponding plurality of alternating peaks 156 and grooves 158, wherein each of the peaks 156 has a first axial width dimension, X, and each of the grooves 158 has a corresponding axial width dimension as described next. As illustrated in FIGS. 6 and 7, the first axial width dimension X is substantially the same for each of the peaks 156, however the axial width dimension can vary for each of the grooves 158. In the particular embodiment illustrated in FIGS. 6 and 7, the width 147 is broken into five sections A, B, C, B, and A. Other embodiments can include additional sections within the same size width as width 147. Both sections A have the same overall width and the same number of grooves 158. Similarly both sections B have the same overall width and the same number of grooves 158. Each of the grooves 158 in section A has a second axial width dimension R wherein dimension R is the same size for all of the corresponding grooves 158 in section A. Similarly, each of the grooves 158 in section B has a third axial width dimension S wherein dimension S is the same size for all of the corresponding grooves 158 in section B. Each of the grooves 158 in section C has a fourth axial width dimension T wherein dimension T is the same size for all of the corresponding grooves 158 in section C. Generally, the fourth axial width dimension T is larger than the third axial width dimension S. The third axial width dimension S is larger than the second axial width dimension R. As such, the second axial width dimension R, the third axial width dimension S, and the fourth axial width dimension T collectively form a generally convex profile as indicated by the dashed lines in FIG. 6.

In the illustrated embodiment, the plurality of grooves 158 includes five groups or sections A, B, C, B, and A that are orderly arranged across the width 147 of the serrated ring 130. The outer two groups A and A of the plurality of grooves 158 have the second axial width dimension R, the middle two groups B and B of the plurality of grooves 158 have the third axial width dimension S, and the center group C of the plurality of grooves 158 has the fourth axial width dimension T, wherein the fourth axial width dimension T is larger than the third axial width dimension S, and the third axial width dimension S is larger than the second axial width dimension R. As such, the fourth axial width dimension T, the third axial width dimension S, and the second axial width dimension R generally form a convex profile or convex sealing plane that spans across the width 147 of the serrated ring 130.

In one embodiment, the first axial width dimension X of the peaks 156 is about 0.125 inches. In this embodiment, the difference between the first axial width dimension X and the fourth axial width dimension T is between 0.012 inches and 0.014 inches. The difference between the first axial width dimension X and the third axial width dimension S is between 0.019 inches and 0.021 inches. The difference between the first axial width dimension X and the second axial width dimension R is between 0.024 inches and 0.026 inches. Moreover, in this embodiment, the five separate sections A, B, C, B, and A, are evenly spaced and distributed across the width 147 of the serrated ring 130.

Beneficially, the serrated ring 130 of the flat metal core ring of isolation gasket 120 provides increased performance in seal-ability and adds more robustness with regard to flange rotation, flange mis-alignment, and over-bolting which are problems in the flange industry. The convex sealing plane also compensates for flange irregularities for which the fire resistant layer 76 and the third non-conductive layer 78 flow into.

In evaluating the pressure-containing capabilities and properties of isolation gasket 20 and similarly isolation gasket 120, a fire test was completed per API standard 6FB (Third Edition, November 1998, Non-bending, On-shore or Open-Offshore Fire Test). Although only isolation gasket 20 was tested, the isolation gasket 120 would behave similarly since the serrated ring 130 would not affect the fire safety rating of isolation gasket 120. The isolation gasket 20 having an outer diameter of about 6 inches was tested. The test involved affixing the isolation gasket 20 between two flanges and fitting the flanges to a test setup at United Valve Inc. of Houston, Tex., USA. The isolation gasket 20 was then subject to burn cycle at an average flame temperature between 1400° and 1800° F. for 30 minutes while maintaining 555 psi. Upon completion of the burn, the pressure was then held during a 30 minute cool down to a temperature below 212° F. The isolation gasket 20 was depressurized and then pressurized back to 555 psi and held for an additional 5 minutes.

The objective of the test was to monitor the total leakage during the duration of the burn/cool down cycle, along with the repressurization cycle with accordance to API 6FB standards. Leakage was determined by the total water level drop through a visual sight gauge during the burn/cool down cycles, and then by manually catching the water in a calibrated container during the repressurization cycle.

The results concluded that the isolation gasket 20 was able to maintain its fire safe characteristics throughout the entirety of the test. During the 30 minute burn and 30 minute cool down period, the measured leakage was only 0 ml/min versus the allowable rate of 22.765 ml/min. The leakage rate during the repressurization cycle was 5 ml/min versus the allowable rate of 22.765 ml/min. The conclusion was that the isolation gasket 20 satisfies the requirements of the API 6FB test protocol.

Below is a summary of the test setup and protocol performed during the gasket fire test with accordance to API 6FB standards:

1. Install the isolation gasket 20 between two CS flanges.
2. Bolt the flanges together using the supplied B7 Studs, 2H Nuts Dielectric Sleeves, and Coated Steel Washers.
3. Apply non-conductive PTFE lubricant to studs/bolts and torque to 225 ft.-lbs.
4. Thread NPT pipe fittings into flanges and affix the flange package in the test setup.
5. Connect all pressure and temperature monitoring equipment in their correct positions. The equipment consisted of 2 flame thermocouples, 3 thermocouples and 3 calorimeter cubes space 120° apart around the circumference of the flange (respectively), and a 4th calorimeter/thermocouple cube place furthest away from the flame sources.
6. Hydrotest the assembly to 555 psi to check all fittings/connections for leaks prior to testing.
7. Confirm pressure and ignite the burners under the flange assembly and start the burn cycle clock.
8. Per the test protocol, the average temperature of the flame thermocouples must reach 1400° F. within 2 minutes of ignition, and maintain an average temperature between 1400° F.-1800° F. with no reading less than 1300° F. until the average calorimeter temperature reaches 1200° F.
9. The average temperature between the 4 calorimeter cubes must reach 1200° F. within 15 minutes of the burner ignition.
10. Conduct the burn cycle for at least 30 minutes.
11. Upon completion of the burn cycle, cool the valve below 212° F.
12. Depressurize the system.
13. Repressurize the system to 555 psi and hold for 5 minutes.
14. Determine the allowable leakage rates:

$$AL = SD * \pi = 7.25 * \pi = 22.765 \text{ in}$$

Where: AL=Allowable Leakage
SD=Mean Gasket Seal Diameter

15. Compare the actual leakage rates vs. the allowable rate.

During the test, data was sampled every 30 seconds. Data collection consisted of: pressure, calorimeter block temperatures (4), thermocouple temperatures (4), and flame thermocouple temperatures (2). Water levels were also visually monitored through a sight gauge on the pressure vessel. A summary of the main data results is outlined below in Table A and the full data results is outlined below in Table B.

TABLE A

| Variable | Data Recorded |
| --- | --- |
| Average System Pressure | 550.59 PSI |
| Average Flame Temperature | 1722.72° F. |
| Time to reach flame temperature of 1,400° F. | 1 min 30 seconds |
| Average Calorimeter Temperature | 1329.4° F. |
| Time to reach average calorimeter temperature of 1,200° F. | 10 min 30 seconds |
| Total Burn Time | 30 min |
| Total Cool Down Time | 30 min |
| Total Repressurization Hold Time | 5 min |
| Average System Pressure during Repressurization | 556.71 PSI |

TABLE B

| Time | Flame 1 | Flame 2 | Cal 1 | Cal 2 | TC1 | TC2 | Cal 3 | TC3 |
| --- | --- | --- | --- | --- | --- | --- | --- | --- |
| 1:57:00 PM | 77.5 | 77.8 | 80.8 | 84.5 | 80.7 | 83.8 | 84 | 84 |
| 1:57:30 PM | 77.5 | 77.8 | 80.8 | 84.5 | 80.7 | 83.7 | 83.8 | 83.9 |
| 1:58:00 PM | 876.3 | 1676.9 | 156.2 | 92.4 | 217.2 | 114.9 | 174.6 | 315.4 |
| 1:58:30 PM | 1711.8 | 1792.6 | 286.1 | 136.7 | 324.1 | 226.6 | 219.3 | 425.8 |
| 1:59:00 PM | 1826.6 | 1802.9 | 350.4 | 213.3 | 379.9 | 365.2 | 410.1 | 593.8 |
| 1:59:30 PM | 1838.7 | 1792.3 | 463.9 | 350.1 | 449.1 | 493 | 554.5 | 709.8 |
| 2:00:00 PM | 1840.2 | 1785.2 | 531.5 | 531.2 | 503.1 | 624.5 | 694.6 | 831.5 |
| 2:00:30 PM | 1839 | 1835.1 | 602.6 | 677.9 | 599.2 | 727.3 | 802.4 | 951 |
| 2:01:00 PM | 1834.9 | 1777.6 | 651.1 | 804.8 | 605.9 | 816.3 | 903 | 1035 |
| 2:01:30 PM | 1834.3 | 1825.9 | 685.8 | 905.7 | 644.8 | 886.5 | 986.1 | 1115.3 |
| 2:02:00 PM | 1832.6 | 1697.2 | 726.9 | 990.9 | 671.5 | 921.5 | 1056.5 | 1145.3 |
| 2:02:30 PM | 1831.2 | 1697.6 | 754 | 1052 | 688 | 977.1 | 1109.5 | 1199.8 |
| 2:03:00 PM | 1835 | 1790.4 | 777.1 | 1104.7 | 726 | 1024.6 | 1155.1 | 1263.9 |
| 2:03:30 PM | 1834.2 | 1803.5 | 803.2 | 1151.2 | 742 | 1060.1 | 1199.5 | 1319.6 |
| 2:04:00 PM | 1830.7 | 1821.5 | 836.4 | 1190.3 | 817.4 | 1077 | 1237 | 1324.4 |
| 2:04:30 PM | 1828.7 | 1823.7 | 883.3 | 1224.4 | 846 | 1130.1 | 1267.8 | 1359.4 |
| 2:05:00 PM | 1830.8 | 1823.1 | 930.5 | 1252.9 | 881.9 | 1135.2 | 1294.8 | 1425.6 |
| 2:05:30 PM | 1830.6 | 1832.2 | 967.3 | 1277.3 | 918.4 | 1149.2 | 1319.5 | 1408.1 |
| 2:06:00 PM | 1823.3 | 1804.4 | 990.9 | 1297.9 | 936.7 | 1165.5 | 1335.5 | 1425.8 |
| 2:06:30 PM | 1831.4 | 1827.8 | 1007.7 | 1316.1 | 963.2 | 1179.4 | 1348.8 | 1470.1 |
| 2:07:00 PM | 1829.2 | 1712.4 | 1031 | 1330.5 | 968.7 | 1171.4 | 1364.7 | 1428.4 |
| 2:07:30 PM | 1823.5 | 1716.8 | 1054.4 | 1333.8 | 972.3 | 928.9 | 1374.8 | 1411.5 |
| 2:08:00 PM | 1828.6 | 1746.4 | 1061.8 | 1340.3 | 975.8 | 934.7 | 1380.4 | 1436.1 |
| 2:08:30 PM | 1824.6 | 1697.9 | 1057.9 | 1346.1 | 978.2 | 1145.7 | 1380.1 | 1398.4 |
| 2:09:00 PM | 1815.8 | 1686.2 | 1052 | 1345.8 | 979.3 | 978.3 | 1373.3 | 1481.7 |
| 2:09:30 PM | 1817.5 | 1657.6 | 1050.3 | 1349.2 | 982.2 | 1012.7 | 1381.8 | 1449.4 |
| 2:10:00 PM | 1813.5 | 1709.7 | 1045.5 | 1352.7 | 973.3 | 1022.2 | 1383.1 | 1428.7 |

TABLE B-continued

| | | | | | | | | |
|---|---|---|---|---|---|---|---|---|
| 2:10:30 PM | 1821.7 | 1798.2 | 1053.5 | 1355.7 | 982.3 | 1048.3 | 1383.2 | 1471.1 |
| 2:11:00 PM | 1820.7 | 1799.9 | 1070.9 | 1361.2 | 1001.7 | 1050.8 | 1391.6 | 1454.8 |
| 2:11:30 PM | 1820.7 | 1776.8 | 1073.5 | 1366.4 | 997.1 | 1044.7 | 1396.4 | 1475.5 |
| 2:12:00 PM | 1823.3 | 1739.1 | 1068.6 | 1371.5 | 997.9 | 1041.6 | 1402.2 | 1460.3 |
| 2:12:30 PM | 1817.4 | 1618.9 | 1059.9 | 1372.3 | 994 | 960 | 1395.5 | 1438.3 |
| 2:13:00 PM | 1825.5 | 1759.2 | 1050.6 | 1370.7 | 978.1 | 987.2 | 1387.6 | 1487.8 |
| 2:13:30 PM | 1815.7 | 1734.1 | 1055.0 | 1375.3 | 982.6 | 958.1 | 1400.1 | 1447.5 |
| 2:14:00 PM | 1817.8 | 1704.2 | 1051.2 | 1372.9 | 967.4 | 968.8 | 1404.3 | 1483.1 |
| 2:14:30 PM | 1815.9 | 1782.6 | 1050.6 | 1373.9 | 997.3 | 1124.8 | 1408.8 | 1477.2 |
| 2:15:00 PM | 1820.3 | 1751 | 1056.9 | 1380.3 | 991.3 | 1093.9 | 1411.8 | 1480.4 |
| 2:15:30 PM | 1822.4 | 1802.8 | 1068 | 1381.6 | 1004.9 | 1126.9 | 1421.5 | 1492.2 |
| 2:16:00 PM | 1823.5 | 1787 | 1083.4 | 1388.8 | 1017.1 | 1135.1 | 1437.9 | 1516.3 |
| 2:16:30 PM | 1817.5 | 1762.8 | 1085.3 | 1395.7 | 1018 | 1158.3 | 1447.1 | 1516 |
| 2:17:00 PM | 1818 | 1799.2 | 1085.4 | 1398.9 | 1018.8 | 1175.3 | 1455.7 | 1562.9 |
| 2:17:30 PM | 1822.4 | 1775.7 | 1100.6 | 1407 | 1036.3 | 1157 | 1464.3 | 1531.1 |
| 2:18:00 PM | 1817.5 | 1708.7 | 1118.2 | 1406.7 | 1036.3 | 1193.9 | 1464.3 | 1637.3 |
| 2:18:30 PM | 1831 | 1844.1 | 1123.65 | 1412.5 | 1073.8 | 1181.9 | 1475.7 | 1560.8 |
| 2:19:00 PM | 1832 | 1845.4 | 1139.1 | 1422.9 | 1083.4 | 1195.4 | 1491.3 | 1585.7 |
| 2:19:30 PM | 1825.4 | 1795.5 | 1154.8 | 1429.2 | 1083.7 | 1190.1 | 1493.9 | 1613.6 |
| 2:20:00 PM | 1820.6 | 1770.7 | 1164.3 | 1431.7 | 1085.9 | 1186.8 | 1492.3 | 1592.6 |
| 2:20:30 PM | 1813.6 | 1730.3 | 1163.7 | 1435.5 | 1085.9 | 1196.1 | 1493.3 | 1606 |
| 2:21:00 PM | 1806.7 | 1604.2 | 1151.1 | 1437.1 | 1061.2 | 1187.7 | 1492.3 | 1542.2 |
| 2:21:30 PM | 1808.3 | 1805.7 | 1142.1 | 1426 | 1093.9 | 1131.8 | 1486.7 | 1624.9 |
| 2:22:00 PM | 1783.2 | 1643.8 | 1141.4 | 1423.5 | 1061.7 | 1154.8 | 1494.5 | 1579.5 |
| 2:22:30 PM | 1795.9 | 1633.9 | 1126.2 | 1420.5 | 1045.8 | 1141.1 | 1483.8 | 1543.6 |
| 2:23:00 PM | 1795.4 | 1765.1 | 1119.6 | 1420.6 | 1054.2 | 1156.3 | 1476.7 | 1582.5 |
| 2:23:30 PM | 1802.2 | 1748 | 1122.4 | 1424.8 | 1041.6 | 1205.9 | 1490 | 1625 |
| 2:24:00 PM | 1761.5 | 1691.6 | 1116.5 | 1427.6 | 1041.3 | 1209.1 | 1494.6 | 1577.6 |
| 2:24:30 PM | 1790.4 | 1801.3 | 1117.6 | 1429.4 | 1059 | 1163.7 | 1492.8 | 1636.2 |
| 2:25:00 PM | 1791.6 | 1723.2 | 1123.1 | 1436.5 | 1056.9 | 1203.9 | 1501.7 | 1596.5 |
| 2:25:30 PM | 1802.9 | 1754.6 | 1124.9 | 1437.2 | 1051.4 | 1147.9 | 1507.8 | 1564 |
| 2:26:00 PM | 1796.8 | 1738.1 | 1118.6 | 1435 | 1034.7 | 1127.2 | 1502.6 | 1526.3 |
| 2:26:30 PM | 1796.4 | 1756.6 | 1114.4 | 1428.2 | 1031.3 | 1121.7 | 1495.1 | 1550.3 |
| 2:27:00 PM | 1802 | 1732.1 | 1123.5 | 1424.9 | 1048.4 | 1123 | 1487.7 | 1556.1 |
| 2:27:30 PM | 1785.7 | 1774.7 | 1126.7 | 1425.7 | 1057.7 | 1070.2 | 1484.7 | 1556.5 |
| 2:28:00 PM | 1575.4 | 1272.3 | 1121.8 | 1413.9 | 1015.3 | 1095.4 | 1456.2 | 1346.4 |
| 2:28:30 PM | 1065.5 | 648.1 | 1080.6 | 1366 | 973.2 | 1065.4 | 1399.5 | 1277 |
| 2:29:00 PM | 753.3 | 390.6 | 1038.2 | 1319.4 | 930.7 | 1044.6 | 1344.6 | 1227.9 |
| 2:29:30 PM | 578.8 | 267.4 | 997.9 | 1270.9 | 889.8 | 1003.3 | 1291.2 | 1189.4 |
| 2:30:00 PM | 457 | 211.3 | 958 | 1224.7 | 851 | 826.1 | 1237.6 | 1154.7 |
| 2:30:30 PM | 387.1 | 181.6 | 848.5 | 1192.4 | 815.8 | 807.2 | 1191.9 | 1113.7 |
| 2:31:00 PM | 338.4 | 166.5 | 813.3 | 1168 | 789.3 | 1076 | 1175.6 | 1088.6 |
| 2:31:30 PM | 299.1 | 156.7 | 782.2 | 1125.4 | 757.1 | 1072.5 | 1135.3 | 1067.8 |
| 2:32:00 PM | 268.5 | 149 | 753.6 | 1081.6 | 733.2 | 1029.1 | 1089.2 | 1019.2 |
| 2:32:30 PM | 242.7 | 142.3 | 724.3 | 1037.5 | 698.4 | 989.6 | 1042.9 | 976.2 |
| 2:33:00 PM | 223.3 | 136.7 | 697.2 | 995 | 677.4 | 923.7 | 998.6 | 940 |
| 2:33:30 PM | 210.6 | 134.4 | 673.2 | 957.1 | 653.2 | 871.8 | 959.8 | 895 |
| 2:34:00 PM | 198.3 | 128.5 | 649.9 | 921.8 | 630.9 | 834.5 | 922.5 | 868.8 |
| 2:34:30 PM | 189.6 | 126.5 | 627.3 | 887 | 610.6 | 832 | 886.2 | 835.9 |
| 2:35:00 PM | 184.3 | 126.5 | 607.5 | 856.6 | 589.5 | 765.4 | 854.8 | 805.2 |
| 2:35:30 PM | 181 | 125.2 | 588 | 827.7 | 571.1 | 721.1 | 825.5 | 780.1 |
| 2:36:00 PM | 175.8 | 122.4 | 569.2 | 799.2 | 554.1 | 712.3 | 796.6 | 750.5 |
| 2:36:30 PM | 170.8 | 120.6 | 551.5 | 772.9 | 537.6 | 744.7 | 769.8 | 728.8 |
| 2:37:00 PM | 166 | 118.5 | 535.6 | 747.7 | 524.2 | 711.2 | 745.5 | 700.7 |
| 2:37:30 PM | 161.7 | 119.4 | 520 | 723.9 | 509.8 | 679.1 | 722.3 | 685.2 |
| 2:38:00 PM | 158.1 | 113.4 | 505.4 | 701.4 | 491.8 | 681.9 | 700.5 | 662.4 |
| 2:38:30 PM | 155.8 | 114.9 | 491.4 | 680.9 | 478.5 | 661.6 | 678.9 | 642.7 |
| 2:39:00 PM | 153.9 | 112.7 | 477.6 | 661.4 | 466.2 | 644.5 | 659.1 | 621.6 |
| 2:39:30 PM | 152.5 | 111.7 | 464.2 | 642.2 | 456.2 | 624.1 | 640.7 | 603.7 |
| 2:40:00 PM | 150.6 | 108.6 | 451.6 | 625.7 | 442.4 | 605 | 623.4 | 583.8 |
| 2:40:30 PM | 147.4 | 105 | 439.1 | 607.7 | 426.8 | 588.7 | 604.7 | 568.1 |
| 2:41:00 PM | 144.8 | 105.5 | 426.9 | 591.5 | 417.7 | 570.9 | 587.6 | 552.6 |
| 2:41:30 PM | 142.2 | 105.1 | 415.8 | 575.9 | 406.2 | 547.3 | 571.6 | 535.8 |
| 2:42:00 PM | 139.4 | 103.8 | 405.4 | 561.5 | 397.7 | 526.7 | 556.8 | 525.7 |
| 2:42:30 PM | 137 | 103.6 | 395.9 | 548.1 | 387 | 495.1 | 542.9 | 510.9 |
| 2:43:00 PM | 134.6 | 102 | 386.1 | 534.4 | 377.6 | 494.3 | 529 | 497 |
| 2:43:30 PM | 132 | 100.7 | 376.1 | 521.2 | 368.1 | 481.6 | 515 | 482.8 |
| 2:44:00 PM | 129.9 | 100.4 | 367.2 | 509 | 360.7 | 434.8 | 502.4 | 470.4 |
| 2:44:30 PM | 127.5 | 99.4 | 358.2 | 497.1 | 351.6 | 420 | 489.5 | 459.1 |
| 2:45:00 PM | 126 | 98.1 | 349.8 | 485.9 | 344.3 | 407.7 | 477.6 | 449.7 |
| 2:45:30 PM | 125.9 | 98.5 | 342.1 | 475.2 | 336 | 398.5 | 466.4 | 439.9 |
| 2:46:00 PM | 125 | 98.1 | 334.8 | 464.4 | 328 | 388.3 | 455.5 | 427.2 |
| 2:46:30 PM | 122.7 | 96.2 | 326.6 | 453.7 | 320.2 | 377.4 | 444.5 | 414.9 |
| 2:47:00 PM | 120.3 | 96.2 | 319.2 | 443.1 | 315.2 | 377 | 433.1 | 404.4 |
| 2:47:30 PM | 118.5 | 96.2 | 312.8 | 434 | 307.1 | 357.8 | 423.5 | 398.2 |
| 2:48:00 PM | 116.6 | 93.7 | 305.2 | 424.5 | 298.9 | 366.5 | 413.6 | 385.6 |
| 2:48:30 PM | 114.1 | 92.9 | 297.9 | 415.5 | 293.1 | 335.9 | 403.6 | 375.1 |
| 2:49:00 PM | 112.7 | 93.9 | 291.8 | 406.5 | 287.3 | 333.8 | 394.5 | 371 |
| 2:49:30 PM | 111.9 | 93.4 | 286.2 | 398.4 | 281.4 | 337.9 | 386.4 | 361.1 |
| 2:50:00 PM | 112 | 93.7 | 280.4 | 390.5 | 276.4 | 334.9 | 378.2 | 355.5 |

TABLE B-continued

| | | | | | | | |
|---|---|---|---|---|---|---|---|
| 2:50:30 PM | 111.2 | 92.2 | 274.7 | 382.5 | 269.7 | 326.1 | 370.4 | 348.8 |
| 2:51:00 PM | 108.5 | 91.7 | 269.1 | 374.7 | 263.8 | 321.2 | 361.1 | 326.6 |
| 2:51:30 PM | 103.9 | 90.4 | 263.4 | 365.7 | 259.3 | 323.4 | 349.9 | 309.2 |
| 2:52:00 PM | 100.5 | 91.3 | 258 | 357.2 | 254.3 | 314.9 | 339.2 | 302.6 |
| 2:52:30 PM | 98.5 | 91.9 | 253.5 | 349.8 | 250.2 | 308.8 | 329.7 | 296.5 |
| 2:53:00 PM | 97.2 | 92.3 | 248.7 | 342.2 | 245.7 | 309.2 | 320.5 | 288.5 |
| 2:53:30 PM | 96 | 92.5 | 244 | 335.1 | 240.2 | 297 | 311.4 | 278.6 |
| 2:54:00 PM | 95 | 90.8 | 239.6 | 328.3 | 235.4 | 290.3 | 302.5 | 276.6 |
| 2:54:30 PM | 93.4 | 88.8 | 235 | 321.7 | 231.3 | 275.8 | 293.8 | 266.5 |
| 2:55:00 PM | 92.4 | 87.2 | 230.5 | 315 | 226.4 | 275.1 | 285.8 | 262.7 |
| 2:55:30 PM | 90.8 | 87 | 224.1 | 308.7 | 201.6 | 288.7 | 278.5 | 230.8 |
| 2:56:00 PM | 91.6 | 91.1 | 185.4 | 289.6 | 174 | 265.2 | 128.8 | 107.6 |
| 2:56:30 PM | 82.2 | 83.3 | 160.9 | 257.7 | 163.4 | 217.1 | 99.5 | 94.5 |
| 2:57:00 PM | 77.6 | 79.8 | 148.5 | 221.5 | 140.9 | 190.7 | 83.1 | 81.1 |
| 2:57:30 PM | 73.8 | 75.9 | 137.5 | 170.1 | 130.4 | 164.5 | 78 | 78 |
| 2:58:00 PM | 69.3 | 68.7 | 123.7 | 153.5 | 116.4 | 149.6 | 76.6 | 75.6 |
| 2:58:30 PM | 68.4 | 66.3 | 116.2 | 148.7 | 111.2 | 144.9 | 75.3 | 74.7 |
| 2:59:00 PM | 67.8 | 65.7 | 112.8 | 147.1 | 108.9 | 143.1 | 74.7 | 73.2 |
| 2:59:30 PM | 67.7 | 64.6 | 109.9 | 145 | 106.9 | 139.5 | 73.7 | 72.9 |
| 3:00:00 PM | 68.9 | 64.2 | 108.7 | 143.9 | 106.5 | 138.5 | 73.8 | 73.1 |
| 3:00:30 PM | 69.6 | 63.7 | 107.6 | 142.9 | 105.4 | 138.5 | 73.7 | 72.4 |
| 3:01:00 PM | 70.1 | 63.6 | 106.5 | 141.5 | 104.6 | 137.2 | 73.6 | 72.3 |
| 3:01:30 PM | 70.4 | 63.5 | 105.4 | 140.4 | 103.8 | 136.5 | 73.5 | 72.3 |
| 3:02:00 PM | 70.9 | 63.5 | 104.6 | 139.6 | 102.9 | 136.4 | 73.4 | 71.6 |
| 3:02:30 PM | 70.9 | 63.2 | 103.4 | 138.3 | 101.7 | 135.6 | 73.1 | 71.5 |
| 3:03:00 PM | 71.1 | 63.2 | 102.4 | 137.4 | 100.8 | 134.7 | 73.1 | 71.6 |
| 3:03:30 PM | 71.4 | 63.5 | 101.7 | 136.4 | 100 | 133.9 | 73.4 | 71.6 |
| 3:04:00 PM | 71.5 | 63.4 | 100.5 | 135.5 | 99 | 133.1 | 73.2 | 71.6 |
| 3:04:30 PM | 71.6 | 63.3 | 99.8 | 134.5 | 98.3 | 131.8 | 73.5 | 71.6 |
| 3:05:00 PM | 71.7 | 63.3 | 98.9 | 133.3 | 97.5 | 131 | 73.6 | 71.6 |
| 3:05:30 PM | 71.9 | 63.8 | 98.2 | 132.5 | 96.8 | 130.2 | 73.7 | 71.9 |
| 3:06:00 PM | 72.2 | 62.9 | 97.8 | 131.5 | 95.6 | 129 | 73.9 | 71.6 |
| 3:06:30 PM | 72.1 | 62.6 | 96.6 | 130.4 | 95.2 | 128 | 73.9 | 71.8 |
| 3:07:00 PM | 72.1 | 62.5 | 95.6 | 129.3 | 94.4 | 127.1 | 74.2 | 71.8 |
| 3:07:30 PM | 72.3 | 62.6 | 94.9 | 128.2 | 93.7 | 126 | 74.3 | 71.9 |
| 3:08:00 PM | 72.4 | 62.6 | 94 | 127 | 92.7 | 124.9 | 74.5 | 71.8 |
| 3:08:30 PM | 72.7 | 62.3 | 93.3 | 125.9 | 92.1 | 123.6 | 74.8 | 72.2 |
| 3:09:00 PM | 74.1 | 64 | 92.6 | 125 | 91.9 | 122.8 | 75.1 | 72.7 |
| 3:09:30 PM | 74.1 | 63.1 | 92 | 124 | 91.1 | 121.9 | 75.4 | 72.5 |
| 3:10:00 PM | 73.5 | 62.8 | 91.5 | 122.9 | 90.4 | 120.7 | 75.5 | 72.6 |
| 3:10:30 PM | 72.8 | 62.9 | 90.8 | 121.9 | 90.1 | 119.6 | 75.5 | 72.9 |
| 3:11:00 PM | 72.5 | 62.5 | 90.4 | 120.9 | 89.3 | 118.9 | 75.6 | 72.9 |
| 3:11:30 PM | 72.5 | 60.9 | 88.6 | 120.2 | 87.4 | 118.7 | 75.5 | 73.2 |
| 3:12:00 PM | 72.1 | 61.9 | 89.1 | 119.3 | 88.1 | 116.9 | 75.6 | 73 |
| 3:12:30 PM | 71.3 | 60.7 | 87.9 | 118.3 | 87.7 | 114.6 | 75.4 | 73.2 |
| 3:13:00 PM | 71.1 | 63.6 | 89 | 117.6 | 87.2 | 114.5 | 76 | 73.8 |
| 3:13:30 PM | 71.4 | 61.5 | 87.5 | 116.2 | 86.9 | 112.8 | 78.7 | 73 |
| 3:14:00 PM | 71.3 | 62 | 86.7 | 115.3 | 86.1 | 111.2 | 75.9 | 73.2 |
| 3:14:30 PM | 71.3 | 62.1 | 86.6 | 114.6 | 85.8 | 110.4 | 76 | 73.6 |
| 3:15:00 PM | 71.4 | 62.1 | 86.4 | 114 | 85.5 | 109.6 | 76 | 73.4 |
| 3:15:30 PM | 71.7 | 62.3 | 85.4 | 113.1 | 85.3 | 109.3 | 76.1 | 73.7 |
| 3:16:00 PM | 71.9 | 62.5 | 85.6 | 112.6 | 84.9 | 110 | 76.3 | 73.7 |
| 3:16:30 PM | 71.9 | 62 | 85.2 | 112 | 85.1 | 109.2 | 76.3 | 73.8 |
| 3:17:00 PM | 71.6 | 61.5 | 84.7 | 110.9 | 84.8 | 108.4 | 76.4 | 73.5 |
| 3:17:30 PM | 71.3 | 61.7 | 85.7 | 110.1 | 84.1 | 107.7 | 76.3 | 73.4 |
| 3:18:00 PM | 70.9 | 61.3 | 83.5 | 109.3 | 83.5 | 106.2 | 76.4 | 73.2 |
| 3:18:30 PM | 70.9 | 61.1 | 84.1 | 108.2 | 83.1 | 105.1 | 76.4 | 73.2 |
| 3:19:00 PM | 70.5 | 61.4 | 84 | 107.5 | 83.1 | 104.6 | 76.3 | 73.2 |
| 3:19:30 PM | 70.5 | 61.5 | 83.3 | 106.8 | 82.6 | 103.8 | 76.2 | 73.2 |
| 3:20:00 PM | 70.8 | 60.6 | 82.6 | 105.9 | 82.7 | 102.6 | 76.3 | 73.2 |
| 3:20:30 PM | 70.1 | 61.4 | 83.1 | 105.4 | 82.8 | 101.8 | 76.3 | 73.5 |
| 3:21:00 PM | 70.5 | 61.7 | 82.3 | 103.8 | 83 | 100.8 | 76.4 | 73.2 |

| Time | Cal 4 | TC4 | Avg. Pressure | Vent | Avg. Flame | Avg. Cal | Avg. TC |
|---|---|---|---|---|---|---|---|
| 1:57:00 PM | 87.3 | 90.7 | 556.5 | 557.2 | 77.65 | 84.2 | 84.8 |
| 1:57:30 PM | 87.3 | 90.5 | 554.7 | 555.5 | 77.65 | 84.1 | 84.7 |
| 1:58:00 PM | 89.3 | 90.1 | 552.7 | 553.8 | 1276.6 | 128.1 | 184.4 |
| 1:58:30 PM | 209.2 | 96.4 | 551.9 | 553.2 | 1752.2 | 212.8 | 268.2 |
| 1:59:00 PM | 272.8 | 170 | 551.5 | 552 | 1814.75 | 311.7 | 377.2 |
| 1:59:30 PM | 413.7 | 263.2 | 551.6 | 552.5 | 1815.5 | 445.6 | 478.8 |
| 2:00:00 PM | 512.7 | 428.9 | 551.3 | 551.8 | 1812.7 | 567.5 | 597.0 |
| 2:00:30 PM | 587.3 | 575.5 | 551 | 551.9 | 1837.05 | 667.6 | 713.3 |
| 2:01:00 PM | 674.2 | 688.8 | 550.6 | 551.2 | 1806.25 | 758.3 | 786.6 |
| 2:01:30 PM | 733.6 | 797.1 | 550.3 | 551.1 | 1830.1 | 827.8 | 860.9 |
| 2:02:00 PM | 794.9 | 894.2 | 550.4 | 550.6 | 1764.9 | 892.3 | 908.1 |
| 2:02:30 PM | 845.7 | 973.6 | 550.1 | 550.9 | 1764.4 | 940.3 | 959.6 |
| 2:03:00 PM | 902.3 | 1044.1 | 549.3 | 550.6 | 1812.7 | 984.8 | 1014.7 |
| 2:03:30 PM | 956.8 | 1103.7 | 549.7 | 550.4 | 1818.85 | 1027.7 | 1056.4 |

TABLE B-continued

| | | | | | | | |
|---|---|---|---|---|---|---|---|
| 2:04:00 PM | 1000.2 | 1153.9 | 550 | 550.2 | 1826.1 | 1066.0 | 1093.2 |
| 2:04:30 PM | 1040.2 | 1196.7 | 549.6 | 550.2 | 1826.2 | 1103.9 | 1133.1 |
| 2:05:00 PM | 1075 | 1222.8 | 549.5 | 549.9 | 1826.95 | 1138.3 | 1166.4 |
| 2:05:30 PM | 1086.8 | 1250 | 548.7 | 549.9 | 1831.4 | 1162.7 | 1181.4 |
| 2:06:00 PM | 1113.4 | 1274.4 | 549 | 549.2 | 1813.85 | 1184.4 | 1200.6 |
| 2:06:30 PM | 1133.9 | 1292.9 | 548.8 | 549.3 | 1829.6 | 1201.6 | 1226.4 |
| 2:07:00 PM | 1140.8 | 1309.3 | 548.5 | 549.2 | 1770.8 | 1216.8 | 1219.5 |
| 2:07:30 PM | 1154.3 | 1324 | 547.8 | 549.4 | 1770.15 | 1229.3 | 1159.2 |
| 2:08:00 PM | 1177.6 | 1333.3 | 548.8 | 549.3 | 1787.5 | 1240.0 | 1170.0 |
| 2:08:30 PM | 1195.5 | 1342.5 | 548.7 | 548.8 | 1761.25 | 1244.9 | 1216.2 |
| 2:09:00 PM | 1211.6 | 1349.5 | 548.2 | 547.6 | 1751 | 1245.7 | 1197.2 |
| 2:09:30 PM | 1227.2 | 1352.1 | 548.1 | 545.6 | 1737.55 | 1252.1 | 1199.1 |
| 2:10:00 PM | 1237.8 | 1358.8 | 547.9 | 548.6 | 1761.6 | 1254.8 | 1195.8 |
| 2:10:30 PM | 1248.7 | 1362.8 | 547.9 | 548.9 | 1809.95 | 1260.3 | 1216.1 |
| 2:11:00 PM | 1260.7 | 1359.9 | 547.7 | 549 | 1810.3 | 1271.1 | 1216.8 |
| 2:11:30 PM | 1271.1 | 1357.5 | 548.1 | 548.9 | 1798.75 | 1276.9 | 1218.7 |
| 2:12:00 PM | 1235.8 | 1348.5 | 548 | 548.5 | 1781.2 | 1269.5 | 1212.1 |
| 2:12:30 PM | 1282.4 | 1311.5 | 548.1 | 548.3 | 1718.15 | 1277.5 | 1176.0 |
| 2:13:00 PM | 1379.9 | 1307.3 | 547.4 | 548.1 | 1792.35 | 1297.2 | 1190.1 |
| 2:13:30 PM | 1387.4 | 1313.6 | 547.1 | 547.5 | 1774.90 | 1304.5 | 1175.5 |
| 2:14:00 PM | 1385.7 | 1377.7 | 546.9 | 547.2 | 1761 | 1303.5 | 1199.3 |
| 2:14:30 PM | 1389.8 | 1427.4 | 546.3 | 546.5 | 1799.25 | 1305.8 | 1256.7 |
| 2:15:00 PM | 1392.7 | 1395.4 | 545.5 | 546.5 | 1785.65 | 1310.4 | 1240.3 |
| 2:15:30 PM | 1404.8 | 1400.8 | 545.4 | 546.4 | 1812.6 | 1319.0 | 1256.2 |
| 2:16:00 PM | 1405.1 | 1402.3 | 545.3 | 545.9 | 1805.25 | 1328.8 | 1267.7 |
| 2:16:30 PM | 1409.5 | 1407.2 | 544.3 | 545.7 | 1790.15 | 1334.4 | 1274.9 |
| 2:17:00 PM | 1416.2 | 1410.1 | 545 | 545.7 | 1808.6 | 1339.1 | 1291.8 |
| 2:17:30 PM | 1422.1 | 1423.2 | 544.5 | 545.3 | 1799.05 | 1348.5 | 1286.9 |
| 2:18:00 PM | 1425.6 | 1422.3 | 544.7 | 543.9 | 1763.1 | 1353.7 | 1322.5 |
| 2:18:30 PM | 1426.4 | 1423.8 | 544 | 545.4 | 1837.55 | 1359.6 | 1310.1 |
| 2:19:00 PM | 1425.2 | 1428.7 | 544.2 | 545.1 | 1838.7 | 1369.6 | 1323.3 |
| 2:19:30 PM | 1424.7 | 1425.1 | 543.7 | 544.3 | 1810.45 | 1375.7 | 1328.1 |
| 2:20:00 PM | 1428.8 | 1429.2 | 544.1 | 544.7 | 1795.65 | 1379.3 | 1323.6 |
| 2:20:30 PM | 1427.8 | 1475.6 | 543.6 | 544.5 | 1771.95 | 1380.1 | 1340.9 |
| 2:21:00 PM | 1428.5 | 1473.9 | 543.2 | 544.3 | 1705.45 | 1377.3 | 1316.3 |
| 2:21:30 PM | 1455.8 | 1469.1 | 543.1 | 544.4 | 1807 | 1377.7 | 1329.9 |
| 2:22:00 PM | 1453.2 | 1468.5 | 543.1 | 543.7 | 1713.5 | 1378.2 | 1316.1 |
| 2:22:30 PM | 1466.3 | 1471.3 | 543.1 | 543.7 | 1714.9 | 1374.2 | 1300.5 |
| 2:23:00 PM | 1470.9 | 1475.9 | 545.9 | 545.6 | 1780.25 | 1372.0 | 1317.2 |
| 2:23:30 PM | 1472.6 | 1475.3 | 553.7 | 558.5 | 1775.1 | 1377.5 | 1337.0 |
| 2:24:00 PM | 1475.3 | 1478.5 | 546.8 | 546.7 | 1726.55 | 1378.5 | 1326.6 |
| 2:24:30 PM | 1480.6 | 1482.6 | 557.1 | 558.1 | 1795.85 | 1380.1 | 1335.4 |
| 2:25:00 PM | 1482.7 | 1484.2 | 553.1 | 553.8 | 1757.4 | 1386.0 | 1335.4 |
| 2:25:30 PM | 1489.3 | 1487.2 | 549.6 | 550.3 | 1778.75 | 1389.8 | 1312.6 |
| 2:26:00 PM | 1499.1 | 1495.3 | 545.8 | 546.7 | 1767.45 | 1388.8 | 1295.9 |
| 2:26:30 PM | 1498.3 | 1495.8 | 542.1 | 542.6 | 1776.50 | 1384.0 | 1299.8 |
| 2:27:00 PM | 1493.2 | 1492.5 | 555.4 | 577.5 | 1767.15 | 1382.3 | 1305.0 |
| 2:27:30 PM | 1490.6 | 1487.3 | 565.7 | 566.8 | 1780.2 | 1381.9 | 1292.9 |
| 2:28:00 PM | 1475.8 | 1474.9 | 558.2 | 559 | 1423.85 | 1366.9 | 1233.0 |
| 2:28:30 PM | 1465.8 | 1460.3 | 556.1 | 556.7 | 856.8 | 1328.0 | 1194.0 |
| 2:29:00 PM | 1421.8 | 1432.1 | 555.5 | 556.5 | 571.95 | 1281.0 | 1158.8 |
| 2:29:30 PM | 1382.4 | 1390.1 | 555.7 | 556.5 | 423.1 | 1235.6 | 1118.2 |
| 2:30:00 PM | 1300.5 | 1299.6 | 555.4 | 552.9 | 334.15 | 1180.2 | 1032.9 |
| 2:30:30 PM | 1251.3 | 1231.2 | 554.8 | 562.1 | 284.35 | 1121.0 | 992.0 |
| 2:31:00 PM | 1175.3 | 1152.3 | 555.3 | 561 | 252.45 | 1083.1 | 1026.6 |
| 2:31:30 PM | 1121.3 | 1099.5 | 555.2 | 561.2 | 227.9 | 1041.1 | 999.2 |
| 2:32:00 PM | 1078.8 | 1050.2 | 554.8 | 555.3 | 208.75 | 1000.8 | 957.9 |
| 2:32:30 PM | 1021.3 | 1032.6 | 554.4 | 547.6 | 192.5 | 956.5 | 924.2 |
| 2:33:00 PM | 999.3 | 1008.3 | 554.4 | 556.1 | 180 | 922.5 | 887.4 |
| 2:33:30 PM | 958.3 | 961.2 | 554 | 550.2 | 172.5 | 887.1 | 845.3 |
| 2:34:00 PM | 921.3 | 923.5 | 554.1 | 559.5 | 163.4 | 853.9 | 814.4 |
| 2:34:30 PM | 886.6 | 873.9 | 553.6 | 555.8 | 158.05 | 821.8 | 788.1 |
| 2:35:00 PM | 855.7 | 843.1 | 553.6 | 554.4 | 155.4 | 793.7 | 750.8 |
| 2:35:30 PM | 826.6 | 815.0 | 553.2 | 554.4 | 153.1 | 767.0 | 721.8 |
| 2:36:00 PM | 797.9 | 786.1 | 553.1 | 554.1 | 149.1 | 740.7 | 700.7 |
| 2:36:30 PM | 771.35 | 760.7 | 552.6 | 549.9 | 145.7 | 716.4 | 693.0 |
| 2:37:00 PM | 746.6 | 735.1 | 552.6 | 553.4 | 142.25 | 693.9 | 667.8 |
| 2:37:30 PM | 723.1 | 713.6 | 553 | 551.5 | 140.55 | 672.3 | 646.9 |
| 2:38:00 PM | 700.95 | 691.3 | 552.6 | 549 | 135.75 | 652.1 | 631.9 |
| 2:38:30 PM | 679.9 | 670.6 | 552.6 | 556.7 | 135.35 | 632.8 | 613.4 |
| 2:39:00 PM | 660.25 | 650.6 | 552.3 | 553.1 | 133.3 | 614.6 | 595.7 |
| 2:39:30 PM | 641.45 | 632.0 | 552.1 | 552.5 | 132.1 | 597.1 | 579.0 |
| 2:40:00 PM | 624.55 | 614.4 | 551.9 | 552.5 | 129.6 | 581.3 | 561.4 |
| 2:40:30 PM | 606.2 | 596.7 | 551.6 | 550.8 | 126.2 | 564.4 | 545.1 |
| 2:41:00 PM | 589.55 | 580.3 | 551.6 | 548.7 | 125.15 | 548.9 | 530.4 |
| 2:41:30 PM | 573.75 | 564.3 | 551.4 | 550.2 | 123.65 | 534.3 | 513.4 |
| 2:42:00 PM | 559.15 | 550.8 | 551.5 | 551.8 | 121.6 | 520.7 | 500.2 |
| 2:42:30 PM | 545.5 | 536.9 | 551.1 | 547.9 | 120.3 | 508.1 | 482.5 |
| 2:43:00 PM | 531.7 | 523.0 | 551.2 | 552.9 | 118.3 | 495.3 | 473.0 |
| 2:43:30 PM | 518.1 | 509.3 | 551 | 555.1 | 116.35 | 482.6 | 460.4 |

TABLE B-continued

| | | | | | | | |
|---|---|---|---|---|---|---|---|
| 2:44:00 PM | 505.7 | 496.9 | 550.6 | 551.9 | 115.15 | 471.1 | 440.7 |
| 2:44:30 PM | 493.3 | 484.8 | 550.5 | 551.3 | 113.45 | 459.5 | 428.9 |
| 2:45:00 PM | 481.75 | 473.7 | 550.1 | 548.4 | 112.05 | 448.8 | 418.9 |
| 2:45:30 PM | 470.8 | 463.1 | 550.5 | 551 | 112.2 | 438.6 | 409.4 |
| 2:46:00 PM | 459.95 | 451.8 | 550.2 | 550 | 111.55 | 428.7 | 398.8 |
| 2:46:30 PM | 449.1 | 440.6 | 550.2 | 551.6 | 109.45 | 418.5 | 388.3 |
| 2:47:00 PM | 438.1 | 429.7 | 549.8 | 549.5 | 108.25 | 408.4 | 381.6 |
| 2:47:30 PM | 428.75 | 421.1 | 549.7 | 548.9 | 107.35 | 399.8 | 371.1 |
| 2:48:00 PM | 419.05 | 410.7 | 549.8 | 551.1 | 105.15 | 390.6 | 365.4 |
| 2:48:30 PM | 409.55 | 400.9 | 549.4 | 549.1 | 103.5 | 381.6 | 351.3 |
| 2:49:00 PM | 400.5 | 393.1 | 549.6 | 549.7 | 103.3 | 373.3 | 346.3 |
| 2:49:30 PM | 392.4 | 384.6 | 549.2 | 549.7 | 102.65 | 365.9 | 341.2 |
| 2:50:00 PM | 384.35 | 377.1 | 549 | 548.9 | 102.85 | 358.4 | 336.0 |
| 2:50:30 PM | 376.45 | 369.5 | 549 | 548.3 | 101.7 | 351.0 | 328.5 |
| 2:51:00 PM | 367.9 | 357.6 | 548.9 | 549.4 | 100.1 | 343.2 | 317.3 |
| 2:51:30 PM | 357.8 | 345.7 | 548.5 | 549.1 | 97.15 | 334.2 | 309.4 |
| 2:52:00 PM | 348.2 | 336.8 | 548.5 | 548.9 | 95.9 | 325.7 | 302.2 |
| 2:52:30 PM | 339.75 | 328.9 | 548.5 | 549.5 | 95.2 | 318.2 | 296.1 |
| 2:53:00 PM | 331.35 | 320.6 | 547.9 | 547.2 | 94.75 | 310.7 | 291.0 |
| 2:53:30 PM | 323.25 | 312.1 | 548 | 549.4 | 94.25 | 303.4 | 282.0 |
| 2:54:00 PM | 315.4 | 305.7 | 547.6 | 548.4 | 92.9 | 296.5 | 277.0 |
| 2:54:30 PM | 307.75 | 297.4 | 547.4 | 548.8 | 91.1 | 289.6 | 267.8 |
| 2:55:00 PM | 300.4 | 291.0 | 547.6 | 547.9 | 89.8 | 282.9 | 263.8 |
| 2:55:30 PM | 293.6 | 277.9 | 547.3 | 545.9 | 88.9 | 276.2 | 249.8 |
| 2:56:00 PM | 209.2 | 183.8 | 546.7 | 546.9 | 91.35 | 203.3 | 182.7 |
| 2:56:30 PM | 178.6 | 157.6 | 545.8 | 546.1 | 82.75 | 174.2 | 158.1 |
| 2:57:00 PM | 152.3 | 134.5 | 544.9 | 545.7 | 78.7 | 151.4 | 136.8 |
| 2:57:30 PM | 124.05 | 112.5 | 544.7 | 545.3 | 74.85 | 127.4 | 121.4 |
| 2:58:00 PM | 115.05 | 105.2 | 538.5 | 539.2 | 69 | 117.2 | 111.7 |
| 2:58:30 PM | 112 | 102.7 | 500.8 | 501.4 | 67.35 | 113.1 | 108.4 |
| 2:59:00 PM | 110.9 | 101.5 | 470.7 | 470.8 | 66.75 | 111.4 | 106.7 |
| 2:59:30 PM | 109.35 | 100.2 | 453.9 | 454.5 | 66.15 | 109.5 | 104.9 |
| 3:00:00 PM | 108.85 | 99.9 | 446.4 | 446.8 | 66.55 | 108.8 | 104.5 |
| 3:00:30 PM | 108.3 | 99.3 | 439.4 | 439.6 | 66.65 | 108.1 | 103.9 |
| 3:01:00 PM | 107.55 | 98.7 | 414.8 | 415.2 | 66.85 | 107.3 | 103.2 |
| 3:01:30 PM | 106.95 | 98.3 | 377.6 | 378 | 66.95 | 106.6 | 102.7 |
| 3:02:00 PM | 106.5 | 97.8 | 355.3 | 355.4 | 67.2 | 106.0 | 102.2 |
| 3:02:30 PM | 105.7 | 97.2 | 345.5 | 345.9 | 67.05 | 105.1 | 101.5 |
| 3:03:00 PM | 105.25 | 96.8 | 340.4 | 340.8 | 67.15 | 104.5 | 101.0 |
| 3:03:30 PM | 104.9 | 96.6 | 324.2 | 324.2 | 67.45 | 104.1 | 100.5 |
| 3:04:00 PM | 104.35 | 96.2 | 159.4 | 159.9 | 67.45 | 103.4 | 100.0 |
| 3:04:30 PM | 104 | 95.9 | 47.5 | 46.9 | 67.45 | 103.0 | 99.4 |
| 3:05:00 PM | 103.45 | 95.5 | 1 | 0.8 | 67.5 | 102.3 | 98.9 |
| 3:05:30 PM | 103.1 | 95.3 | 1.2 | 1.1 | 67.85 | 101.9 | 98.6 |
| 3:06:00 PM | 102.7 | 94.9 | 1.3 | 0.5 | 67.55 | 101.5 | 97.8 |
| 3:06:30 PM | 102.15 | 94.6 | 0.9 | 0.8 | 67.35 | 100.8 | 97.4 |
| 3:07:00 PM | 101.75 | 94.3 | 53.9 | 53.1 | 67.3 | 100.2 | 96.9 |
| 3:07:30 PM | 101.25 | 93.9 | 214 | 214.2 | 67.45 | 99.7 | 96.4 |
| 3:08:00 PM | 100.75 | 93.5 | 399.2 | 399.8 | 67.5 | 99.1 | 95.7 |
| 3:08:30 PM | 100.35 | 93.3 | 526.5 | 527.3 | 67.5 | 98.6 | 95.3 |
| 3:09:00 PM | 100.05 | 93.2 | 563.7 | 564.5 | 69.05 | 98.2 | 95.2 |
| 3:09:30 PM | 99.7 | 92.9 | 576 | 576.9 | 68.6 | 97.8 | 94.6 |
| 3:10:00 PM | 99.2 | 92.6 | 550.5 | 551.2 | 68.15 | 97.3 | 94.1 |
| 3:10:30 PM | 98.7 | 92.3 | 546.9 | 547.4 | 67.85 | 96.7 | 93.7 |
| 3:11:00 PM | 98.25 | 91.9 | 544.7 | 545.3 | 67.5 | 96.3 | 93.3 |
| 3:11:30 PM | 97.85 | 91.7 | 543.1 | 544 | 66.7 | 95.5 | 92.7 |
| 3:12:00 PM | 97.45 | 91.3 | 542.4 | 543.2 | 67 | 95.4 | 92.3 |
| 3:12:30 PM | 96.85 | 90.9 | 561.6 | 562.5 | 66 | 94.6 | 91.6 |
| 3:13:00 PM | 96.8 | 91.1 | 564.5 | 565.4 | 67.35 | 94.9 | 91.6 |
| 3:13:30 PM | 97.45 | 91.3 | 564.8 | 565.6 | 66.45 | 95.0 | 91.0 |
| 3:14:00 PM | 95.6 | 90.0 | 564.8 | 565.5 | 66.65 | 93.4 | 90.1 |
| 3:14:30 PM | 95.3 | 89.9 | 557.5 | 558 | 66.7 | 93.1 | 89.9 |
| 3:15:00 PM | 95 | 89.6 | 402.9 | 403.4 | 66.75 | 92.9 | 89.5 |
| 3:15:30 PM | 94.6 | 89.4 | 283.6 | 283.8 | 67 | 92.3 | 89.4 |
| 3:16:00 PM | 94.45 | 89.3 | 124.8 | 124.7 | 67.2 | 92.2 | 89.5 |
| 3:16:30 PM | 94.15 | 89.1 | 48.4 | 47.9 | 66.95 | 91.9 | 89.3 |
| 3:17:00 PM | 93.65 | 88.6 | 14.2 | 13.7 | 66.55 | 91.4 | 88.8 |
| 3:17:30 PM | 93.2 | 88.3 | 1.9 | 1.7 | 66.5 | 91.3 | 88.4 |
| 3:18:00 PM | 92.85 | 87.9 | 1.1 | 0.6 | 66.1 | 90.5 | 87.7 |
| 3:18:30 PM | 92.3 | 87.5 | 1.3 | 0.9 | 66 | 90.3 | 87.2 |
| 3:19:00 PM | 91.9 | 87.2 | 1.3 | 0.8 | 65.95 | 89.9 | 87.0 |
| 3:19:30 PM | 91.5 | 86.9 | 0.9 | 0.8 | 66 | 89.5 | 86.6 |
| 3:20:00 PM | 91.1 | 86.6 | 1.1 | 0.7 | 65.7 | 89.0 | 86.3 |
| 3:20:30 PM | 90.85 | 86.5 | 1.2 | 0.8 | 65.75 | 88.9 | 86.2 |
| 3:21:00 PM | 90.1 | 85.9 | 1.2 | 0.8 | 66.1 | 88.2 | 85.7 |

Figure 10:
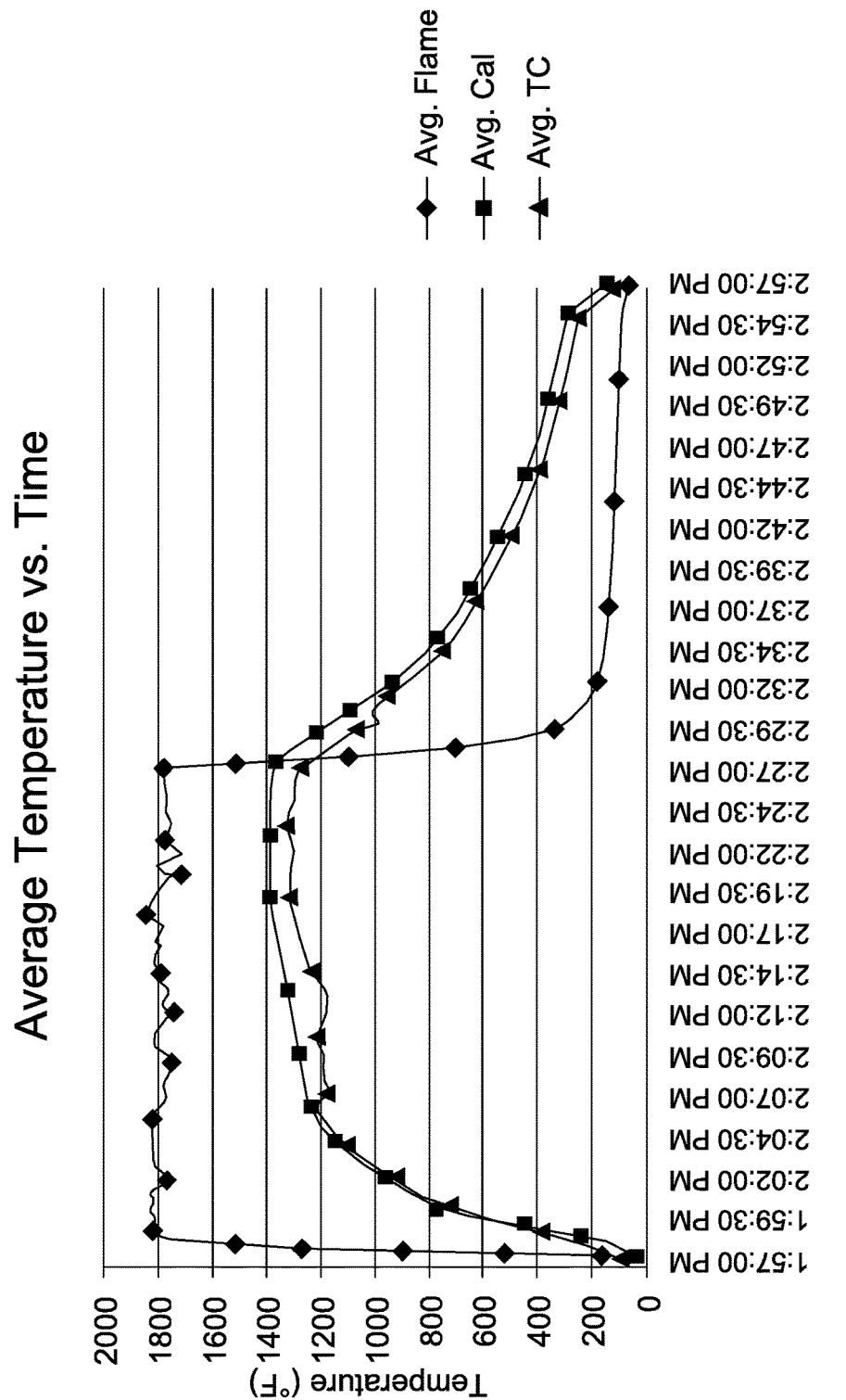
FIG. 10 illustrates a first data curve that depicts gasket fire test results including time duration across a horizontal axis and temperature along a vertical axis in accordance with API 6FB standards.
Figure 11:
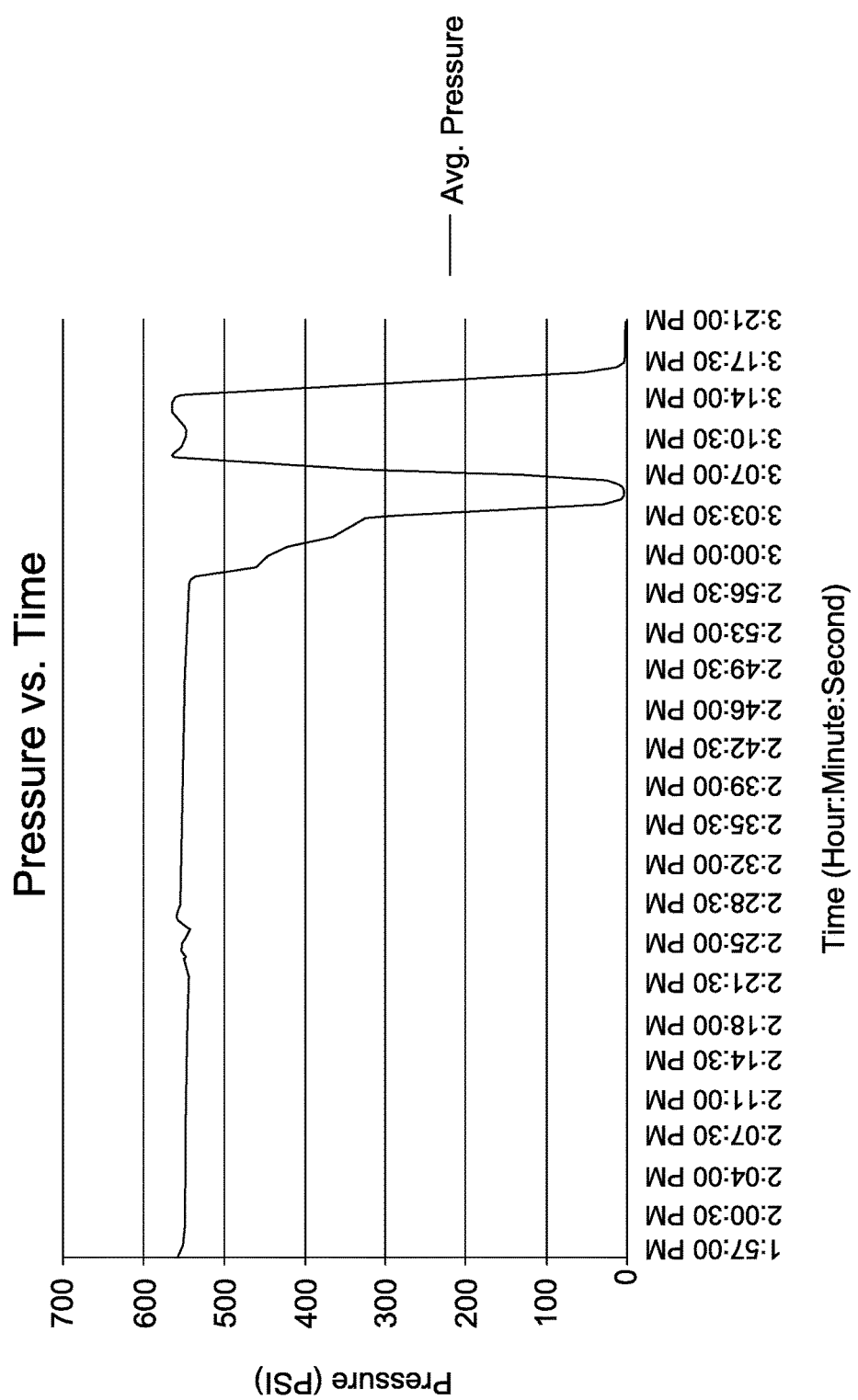
FIG. 11 illustrates a second data curve that depicts the FIG. 10 gasket fire test results including time duration across a horizontal axis and pressure along a vertical axis.

As evident from the tests, the isolation gasket 20 was able to maintain its fire safe characteristics throughout the entirety of the test. During the 30 minute burn and 30 minute cool down period, the measured leakage was 0 ml/min versus the allowable rate of 22.765 ml/min. The leakage rate during the repressurization cycle was 5 ml/min versus the allowable rate of 22.765 ml/min. The conclusion is that the isolation gasket 20 satisfies the requirements of the API 6FB test protocol. The two data curves illustrated in FIGS. 10 and 11 depict the time duration of the test across the horizontal axis and the temperature or the pressure along the vertical axis.

Turning now to the manufacture and assembly of the isolation gasket 20 or isolation gasket 120, typically the flat metal core ring 22 is manufactured from a large sheet of 0.250" thick material that is the core material of choice. One example of material used for flat metal core ring 22 is 316L stainless steel. A water jet is used to cut the inner diameter 36 and the outside diameter 60 of the flat metal core ring 22. Lathes are then used to turn the flat metal core ring 22 while the inner diameter 36, the outside diameter 60, the inner ring 32, the outer ring 34, and the serrated ring 30 are cut with various tools. A water jet or another device is then used to cut the first non-conductive layer 70, the second non-conductive layer 72, the fire resistant layer 76, and the third non-conductive layer 78 from respective larger pieces of material. Adhesive or glue is then used to adhere the appropriately sized first non-conductive layer 70, the second non-conductive layer 72, the fire resistant layer 76, and the third non-conductive layer 78 to the flat metal core ring 22.

Figure 8:
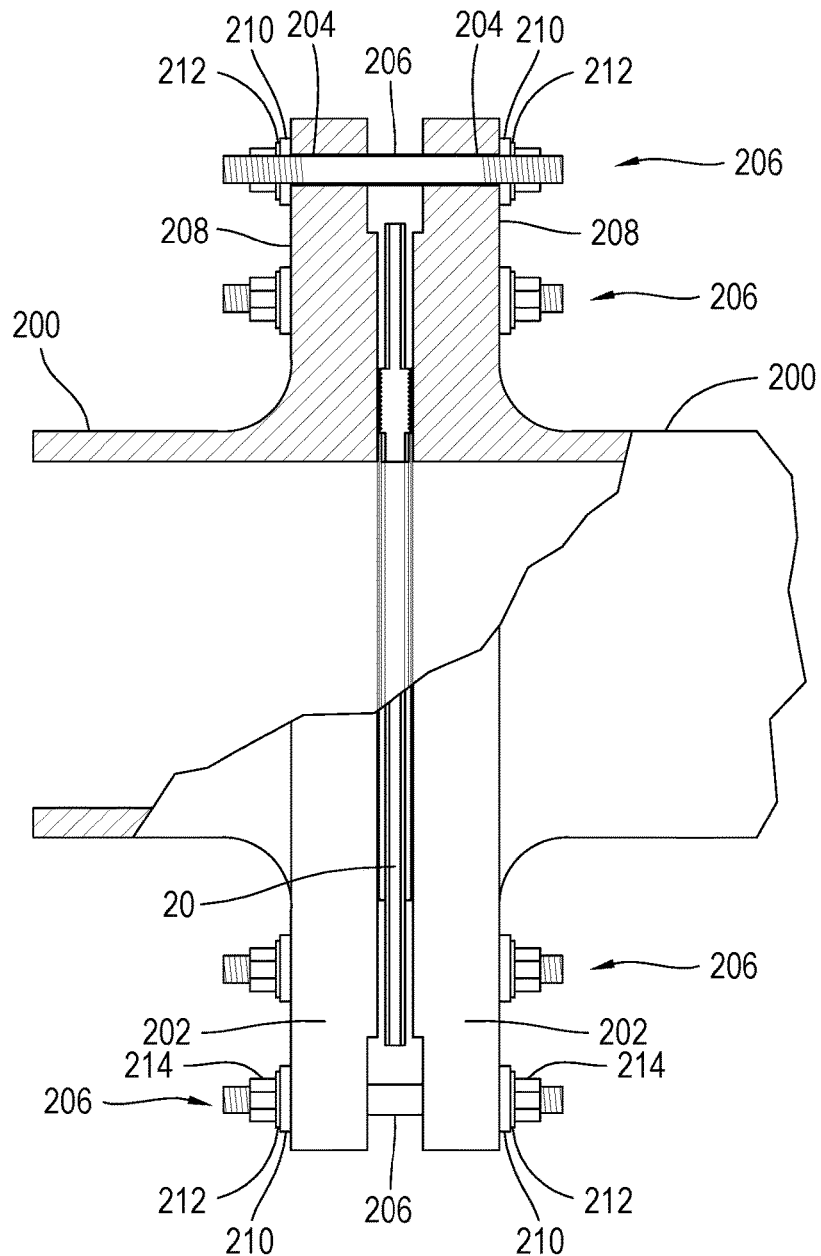
FIG. 8 illustrates a side view and a partial cross sectional view of the isolation gasket in the FIG. 1 embodiment.
Figure 9:
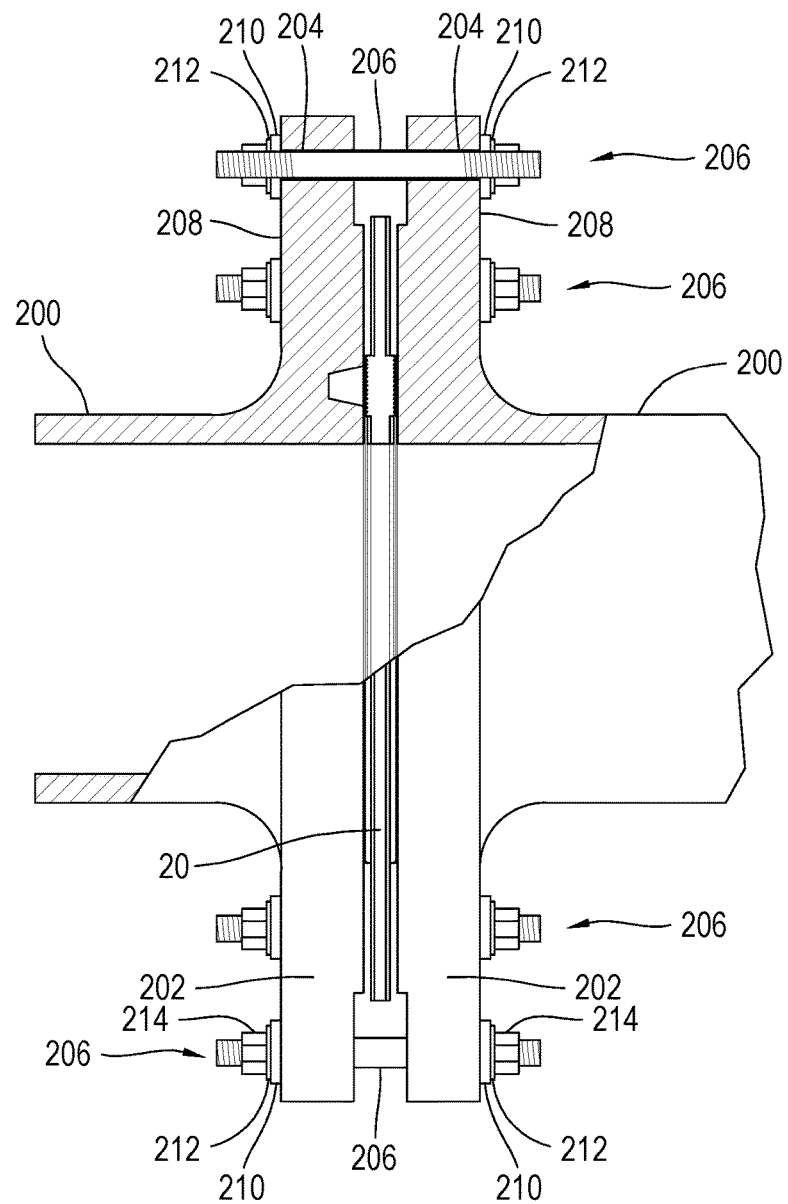
FIG. 9 illustrates a side view and a partial cross sectional view of the isolation gasket in the FIG. 1 embodiment.

Turning now to application of the isolation gasket 20 or isolation gasket 120, in one embodiment, the isolation gasket 20 or isolation gasket 120 is used between two flanges in a flow line application however the isolation gasket 20 or 120 may be used in other pipe connections. The following example will discuss the isolation gasket 20 in combination with two pipe sections however the example is also applicable for the isolation gasket 120. Illustrated in FIG. 8 is the isolation gasket 20 positioned between two pipe sections 200 in a flow line application such that the inner diameter 36 of the inner ring 32 aligns with the diameter of the pipe sections 200. Each of the pipe sections 200 includes a flange 202 which is placed in a confronting relationship with the isolation gasket 20 positioned therebetween. Flanges 202 include one or more bores 204 which align with one another so that nut and bolt sets 206 may be used to connect the flanges 202.

Beneficially electrical isolation between the flanges 202 is achieved through the connection by various parts as described next. A pair of aligned bores 204 with a sleeve 206 is constructed between the flanges 202. The sleeve 206 can be made of a glass reinforced polymer although other materials, such as epoxy, phenolic, and meta-aramid materials may be used. The sleeve 206 has a length that is about the same as the distance between outer surfaces 208 of flanges 202 with gasket 20 positioned therebetween. Once sleeve 206 has been inserted into the pair of aligned bores 204, isolating washers 210 are placed on either side of bores 204 on outer surfaces 208 of flanges 202. In this embodiment, metal washers 212 are then positioned against washer 210 and bolt 206 is passed through the washers and sleeve 206 after which it is secured by nuts 214. Other embodiments may not include metal washers 212. At each of the aligned bores 204 the same process is repeated and thereafter nuts 214 may be tightened to compress gasket 20 at a desired pressure.

Isolation gasket 20 or 120 in combination with isolating washers 210 and sleeves 206 provide electrical isolation of separate pipe sections 200. Isolating washers 210 are positioned against outer surfaces 208 of flanges 202 and in combination with sleeve 206, provide electrical isolation between the nut and bolt sets 206 and the flanges 202. In one form, the isolating washers 210 are metal core washers that are coated with a dielectric material.

The uses of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein.

While the invention has been illustrated and described in the foregoing description, the same is to be considered as illustrative and not restrictive in character, it being understood that only certain preferred embodiments have been described and that all changes and modifications that come within the spirit of the invention are desired to be protected. In addition, all references cited herein are indicative of the level of skill in the art and are hereby incorporated by reference in their entirety.

What is claimed is:

1. An isolation gasket for use between facing flanges of two flow conduit sections for fluid passage therethrough, the isolation gasket comprising:
   a flat metal core ring having an upper face opposing a lower face and an opening formed therein to allow fluid passage therethrough, the flat metal core ring having a serrated ring positioned between an inner ring and an outer ring, the serrated ring having a plurality of serrations along the upper face and the lower face;
   a first non-conductive layer on the upper face and the lower face of the inner ring to provide a dieletric barrier for the inner ring;
   a non-conductive coating on the plurality of serrations along the upper face and the lower face of the serrated ring to provide a dielectric barrier for the serrated ring;
   a second non-conductive layer on the upper face and the lower face of the outer ring to provide a dielectric barrier for the outer ring;
   a fire resistant layer on the non-conductive coating that is positioned on the serrated ring, wherein the fire resistant layer spans from an outer edge of the serrated ring to a mid-region of the serrated ring; and
   a third non-conductive layer on the non-conductive coating that is positioned on the serrated ring, wherein the third non-conductive layer spans from an inner edge of the serrated ring to the mid-region of the serrated ring, wherein the fire resistant layer abuts against the third non-conductive layer.

2. The isolation gasket of claim 1, wherein the non-conductive coating is made of polytetrafluoroethylene.

3. The isolation gasket of claim 1, wherein the fire resistant layer is made of mica or aluminosilicate.

4. The isolation gasket of claim 1, wherein the third non-conductive layer is made of biaxially-oriented filled polytetrafluoroethylene.

5. The isolation gasket of claim 1, wherein the fire resistant layer abuts against the third non-conductive layer at a mid-point between the inner edge and the outer edge of the serrated ring.

6. The isolation gasket of claim 1, wherein the plurality of serrations have a corresponding plurality of alternating peaks and grooves, wherein each of the peaks has a first axial width dimension and each of the grooves has a second axial width dimension, the first axial width dimension being substantially the same for each of the peaks, and the second axial width dimension being substantially the same for each of the grooves.

7. The isolation gasket of claim 1, wherein the plurality of serrations have a corresponding plurality of alternating peaks and grooves, wherein each of the peaks has a first axial width dimension that is substantially the same for each of the peaks, and wherein the plurality of grooves includes five groups that are orderly arranged across a width of the serrated ring, wherein the outer two groups of the plurality of grooves have a second axial width dimension, the middle two groups of the plurality of grooves have a third axial width dimension, and the center group of the plurality of grooves has a fourth axial dimension, wherein the fourth axial width dimension is larger than the third axial width dimension, and the third axial width dimension is larger than the second axial width dimension.

8. The isolation gasket of claim 7, wherein the fourth axial width dimension, the third axial width dimension, and the second axial width dimension generally form a convex profile that spans across the width of the serrated ring.

9. In combination:
a pair of joined flow conduit sections which are constructed and arranged with facing flanges, each flow conduit section having a through bore; and
an isolation gasket for use between said facing flanges, the isolation gasket comprising:
a flat metal core ring having an upper face opposing a lower face and an opening formed therein to allow fluid passage therethrough, the flat metal core ring having a serrated ring positioned between an inner ring and an outer ring, the serrated ring having a plurality of serrations along the upper face and the lower face;
a first non-conductive layer on the upper and the lower faces of the inner ring to provide a dieletric barrier;
a non-conductive coating on the upper and the lower faces of the serrated ring;
a second non-conductive layer on the upper and the lower faces of the outer ring to provide a dielectric barrier;
a fire resistant layer on the non-conductive coating that is positioned on the serrated ring; and
a third non-conductive layer on the non-conductive coating that is positioned on the serrated ring, wherein the third non-conductive layer is adjacent the fire resistant layer.

10. The isolation gasket of claim 9, wherein the fire resistant layer spans from an outside diameter of the serrated ring to a middle diameter of the serrated ring, and wherein the third non-conductive layer spans from the middle diameter to an inside diameter of the serrated ring.

11. The isolation gasket of claim 9, further comprising:
at least one isolating sleeve positioned in an aligned bore formed in each of the facing flanges, the isolating sleeve having a length that is substantially equal to a distance between an outer face of each of the flanges with the isolation gasket positioned between the facing flanges;
at least one elongate metal fastener having opposing ends, the fastener received in the isolating sleeve for connecting the flanges to one another with the isolation gasket interposed therebetween; and
an isolating washer positioned on each of the at least one elongate metal fastener abutting the outer face of the flange.

12. The isolation gasket of claim 11, wherein the isolating washer includes a metal washer having opposing side surfaces with a sheet of dielectric material laminated to one of the opposing side surfaces and wherein the dielectric material abuts at least the outer face of the flange.

13. The isolation gasket of claim 11, wherein the isolating washer includes a metal core coated with a dielectric material.

14. The isolation gasket of claim 11, wherein the isolating sleeve includes a sleeve made of one of glass reinforced polymer material, epoxy material, phenolic material, and meta-aramid material.

15. The isolation gasket of claim 11, wherein the metal fastener includes a metal shaft threaded to receive a nut on at least one of the opposing ends.

16. The isolation gasket of claim 9, wherein the plurality of serrations have a corresponding plurality of alternating peaks and grooves, wherein each of the peaks has a first axial width dimension and each of the grooves has a second axial width dimension, the first axial width dimension being substantially the same for each of the peaks, and the second axial width dimension being substantially the same for each of the grooves.

17. The isolation gasket of claim 9, wherein the plurality of serrations have a corresponding plurality of alternating peaks and grooves, wherein each of the peaks has a first axial width dimension that is substantially the same for each of the peaks, and wherein the plurality of grooves includes five groups that are orderly arranged across a width of the serrated ring, wherein the outer two groups of the plurality of grooves have a second axial width dimension, the middle two groups of the plurality of grooves have a third axial width dimension, and the center group of the plurality of grooves has a fourth axial dimension, wherein the fourth axial width dimension is larger than the third axial width dimension, and the third axial width dimension is larger than the second axial width dimension.

18. The isolation gasket of claim 17, wherein the fourth axial width dimension, the third axial width dimension, and the second axial width dimension generally form a convex profile that spans across the width of the serrated ring.

19. An isolation gasket for use between facing flanges of two flow conduit sections for fluid passage therethrough, the isolation gasket comprising:
a flat metal core ring having an upper face opposing a lower face and an opening formed therein to allow fluid passage therethrough, the flat metal core ring having a serrated ring positioned between an inner ring and an outer ring, the serrated ring having a plurality of serrations along the upper face and the lower face;
a first non-conductive layer on the upper face and the lower face of the inner ring to provide a dieletric barrier for the inner ring;
a second non-conductive layer on the upper face and the lower face of the outer ring to provide a dielectric barrier for the outer ring;
a non-conductive coating applied on the plurality of serrations of the upper face and the lower face of the serrated ring to provide a dielectric barrier for the serrated ring;

a fire resistant layer and a third non-conductive layer arranged in a side by side orientation on the non-conductive coating applied on the plurality of serrations of the serrated ring, wherein each of the fire resistant layer and the third non-conductive layer covers approximately half of the serrated ring.

20. The isolation gasket of claim 19, wherein the fire resistant layer spans from an outer edge of the serrated ring to a mid-region of the serrated ring, and the third non-conductive layer spans from an inner edge of the serrated ring to the mid-region of the serrated ring such that the fire resistant layer and the third non-conductive layer do not overlap.

21. The isolation gasket of claim 19, wherein the non-conductive coating is made of polytetrafluoroethylene.

22. The isolation gasket of claim 19, wherein the fire resistant layer is made of mica or aluminosilicate.

23. The isolation gasket of claim 19, wherein the third non-conductive layer is made of biaxially-oriented filled polytetrafluoroethylene.

24. The isolation gasket of claim 19, wherein the plurality of serrations have a corresponding plurality of alternating peaks and grooves, wherein each of the peaks has a first axial width dimension and each of the grooves has a second axial width dimension, the first axial width dimension being substantially the same for each of the peaks, and the second axial width dimension being substantially the same for each of the grooves.

25. The isolation gasket of claim 19, wherein the plurality of serrations have a corresponding plurality of alternating peaks and grooves, wherein each of the peaks has a first axial width dimension that is substantially the same for each of the peaks, and wherein the plurality of grooves includes five groups that are orderly arranged across a width of the serrated ring, wherein the outer two groups of the plurality of grooves have a second axial width dimension, the middle two groups of the plurality of grooves have a third axial width dimension, and the center group of the plurality of grooves has a fourth axial dimension, wherein the fourth axial width dimension is larger than the third axial width dimension, and the third axial width dimension is larger than the second axial width dimension.

26. The isolation gasket of claim 25, wherein the fourth axial width dimension, the third axial width dimension, and the second axial width dimension generally form a convex profile that spans across the width of the serrated ring.

* * * * *